(12) United States Patent
Chorn

(10) Patent No.: US 6,275,843 B1
(45) Date of Patent: Aug. 14, 2001

(54) METHOD AND APPARATUS FOR PROCESSING MULTIPLE SERVICE REQUESTS WITHIN A GLOBAL TRANSACTION BY A SINGLE SERVER APPLICATION PROGRAM INSTANCE

(75) Inventor: Thomas J. Chorn, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/934,788

(22) Filed: Sep. 22, 1997

Related U.S. Application Data

(63) Continuation of application No. 08/363,444, filed on Dec. 22, 1994, now abandoned.

(51) Int. Cl.$^7$ .................................................. G06F 9/00
(52) U.S. Cl. ............................................. 709/101; 709/313
(58) Field of Search .................................. 395/680, 671, 395/683; 707/10; 709/300, 303, 101, 310–332

(56) References Cited

U.S. PATENT DOCUMENTS

| | | | |
|---|---|---|---|
| 4,412,285 | * | 10/1983 | Neches ............................ 395/200.82 |
| 4,881,166 | * | 11/1989 | Thompson et al. ................... 395/600 |
| 5,021,949 | * | 6/1991 | Morten et al. .................... 395/200.09 |
| 5,241,675 | * | 8/1993 | Sheth et al. ......................... 395/600 |
| 5,247,664 | * | 9/1993 | Thompson et al. ................... 395/600 |
| 5,504,900 | * | 4/1996 | Raz ....................................... 395/650 |
| 5,675,798 | * | 10/1997 | Chang .................................. 395/680 |
| 5,680,610 | * | 10/1997 | Smith et al. ......................... 395/610 |

OTHER PUBLICATIONS

Willis, John M., "DECtp and VMS interoperability: building the foundation for mission–critical OLTP systems", DEC Professional, v10, n12, p34(5), Nov. 1991.*
Dolgicer, Max, "A Formal Look at Tuxedo", Data Communications, p. 33; vol. 22, No. 12, Sep. 1993.*
Howells, Ian "Overdrawn!", EXE, v8, n5, p26(4), Oct. 1993.*
Howell, Ian, "Overdrawn," EXE, pp(6), Oct. 1993.*
Orfali, Robert, et al., "Essential Client/Server Survival Guide", Van Nostrand Reinhold, pp. 261–288), 1994.*
Orfali et al., "The Essential Client/Server Survival Guide," Van Nostrand Reinhold, pp. 124–128, pp. 241–284, 1994.*

* cited by examiner

Primary Examiner—St. John Courtenay, III
(74) Attorney, Agent, or Firm—Beth L. McMahon; Michael B. Atlass; Charles A. Johnson

(57) ABSTRACT

A system is disclosed in which multiple service requests of a global transaction are processed by a single server application program instance without the use of multiple intermediate communication server instances. A client application program instance initiates a global transaction that results in multiple service requests to be processed according to the logic of a server application program. A single server application program instance is started to process the multiple service requests. For each of the multiple service requests, an associated transaction message control endpoint is provided to the single server application program instance. The single server application program instance monitors the associated endpoints for transaction control messages.

25 Claims, 15 Drawing Sheets

METHOD AND APPARATUS FOR PROCESSING MULTIPLE SERVICE REQUESTS WITHIN A GLOBAL TRANSACTION BY A SINGLE SERVER APPLICATION PROGRAM INSTANCE

This application is a continuation of application Ser. No. 08/363,444 filed on Dec. 22, 1994, now abandoned.

BACKGROUND

1. Field of the Invention

This invention generally relates to transaction processing systems and more particularly relates to transaction processing systems capable of processing global transactions and the processing of multiple service requests within a global transaction by a single instance of a server application program.

2. General Background

Advances in hardware and software technology, in combination with new computing models, are expanding the possible functionality for On-line Transaction Processing (OLTP) application software.

On-line Transaction Processing (OLTP) is a style of data processing in which users at terminals or workstations send messages to application programs which update databases in real time. This is in contrast to batch or queued processing of transactions where the transactions are processed at a later time. An example of an OLTP application is an airline reservation system.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques* by Jim Gray and Andrea's Reuter, Morgan Kaufmann Publishers, Inc., 1993, p. 6:

Atomicity. A transaction's changes to the state are atomic; either all happen or none happen. These changes include database changes, messages, and actions on transducers.

Consistency. A transaction is a correct transformation of the state. The actions taken as a group do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), its changes to the state survive system failures.

To maintain the properties identified above, at the beginning of processing a transaction, a transaction processing application program invokes a Begin-Transaction function to indicate processing of a transaction has begun. This operation is typically logged to an audit file to demarcate the operations associated with a particular transaction. Following the Begin-Transaction function, the other functions associated with the application defined transaction are performed and are also logged to an audit file. If all operations associated with a transaction complete successfully, a Commit function is invoked to make permanent any state changes that have occurred as a result of the transaction. The Commit operation is logged to the audit file to indicate that all operations have completed successfully. If an error occurs during processing of the transaction and a Commit operation is not performed, a Rollback function is invoked to undo the effects of the operations performed in processing the transaction.

The Client/Server computing model provides a framework in which the functionality of transaction processing applications may be expanded. Under the traditional mainframe transaction processing application model, the user interface, application control, and data management control all execute on a single data processing system. Generally, the Client/Server computing model involves a Client application program submitting service requests to a Server application program, and the Server application program processing the requests and returning responses to the Client. Thus, a Client/Server environment has the user interface, application control, and data management control distributed among two or more data processing systems. The Server application programs must contain data management components and may also provide some functions of other components.

One widely used scheme for classifying Client/Server type systems is according to how they distribute user interface, application, and data management components between the Client and Server data processing systems. Two examples include the remote presentation type Client/Server application and the distributed data processing Client/Server application. In a remote presentation application, all the user interface functionality resides on the Client system and all other functionality resides on the Server system.

For a distributed data processing Client/Server system, the data management functionality is divided between the Client and Server systems. All other functionality is placed on the Client system. The distributed data processing Client/Server model allows databases to be split among multiple systems and fosters development of distributed transaction processing applications.

Transaction processing in a Client/Server environment may be either non-global or global. In a non-global client/server transaction, the same work takes place as in a traditional transaction, but the work is distributed in a Client/Server manner. For example, a travel agent may request an airline reservation via a workstation Client application program that has a graphical user interface. The Client application program communicates with a Server application program that manages the reservation database. The Server application program updates the database, commits or aborts its own work, and returns information to the Client application program, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation Client application program with a graphical user interface. The Client program contacts three Server application programs on different transaction processing systems. One Server program books a flight, another reserves a car, and the third makes a hotel reservation. Each of the Server application programs updates its respective database. The transactions processed by each of the Server application programs may be referred to as a subordinate transactions of the global transaction. A global transaction manager coordinates the updates to the three databases, and a subordinate transaction manager on each of the individual transaction processing systems coordinates locally with the Server application programs. The Server application programs return information to the Client application program.

A major advantage of global transaction processing is that tasks that were once processed individually are processed as a group, the group of tasks being the global transaction. The database updates are made on an all or nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepares to commit their updates to the respective databases. If all the local transaction managers respond that they are prepared to commit, the global transaction manager sends a commit request to the local transaction managers. Thus the two parts of the two-phase commit are prepare to commit the database updates and commit the database updates.

As part of a global transaction, a Client application program may generate multiple service requests to be processed by the same Server application program logic. If the Client application program and Server application program are resident on separate data processing systems, there are numerous layers of hardware and software involved in initially sending the multiple service requests and in the corresponding dialogue between the Client application program and Server application program. Communicating through the layers of hardware and software introduces processing overhead for a global transaction.

Where multiple service requests of a global transaction are to be processed by the same Server application program logic, prior art distributed transaction processing systems introduce processing overhead in two ways. First, while the same Server application program logic is capable of processing multiple service requests within a global transaction, a separate instance (or executing process within a data processing system) of the Server application program would be started to process each of the service requests. Processing overhead is introduced because multiple processes must be managed. Furthermore, database locks may not be shared between the separate Server application program instances.

A second way in which processing overhead is introduced is in the mechanism through which messages are sent from and received by the Server application program. Some systems start a separate intermediate communication program instance for each service request that is received. Then through interprocess communication mechanisms, the service request and subsequent communication between the Client application program and the Server application program instance are passed through the associated intermediate communication program instance. This adds processing overhead to the system because of multiple intermediate communication program instances on the system of the Server application program.

Therefore, while a transaction processing system capable of processing global transactions provides great flexibility in the types of applications that may be developed, the communication processing overhead may be a limiting factor if an application has demanding transaction throughput requirements.

SUMMARY OF THE INVENTION

Therefore it would be desirable and it is an object of the invention to reduce communication overhead processing in a global transaction processing system.

A further object of the invention is to reduce overhead processing involved in receiving service requests and transaction control messages and in sending responses to the service requests and transaction control messages.

It is an object of the invention to reduce communication processing overhead in processing multiple service requests within a global transaction.

A further object is to process multiple service requests of a global transaction by a single instance of a server application program and automatically start a new server application program instance if an existing server application program instance has not completed processing a previously issued service request.

Another object is to process transaction control messages that are associated with multiple service requests such that a deadlock scenario is not allowed to develop.

Yet another object is provide a method that is compatible with an Open Systems Interconnection—Transaction Processing (OSI-TP) service element for processing multiple service request by a single server application program instance without the use of multiple intermediate communication servers.

The foregoing and other objects are attained in a transaction processing system for processing global transactions. The transaction processing system includes a client system and a server system, wherein the client system is a data processing system having transaction processing software for processing global transactions, and the server system is a data processing system having transaction processing software for processing global transactions. The client system includes a client application program for initiating a global transaction, and the server system has a server application program for processing one or more service requests that are part of the global transaction.

Multiple service requests in a global transaction are issued to be processed by a server application program. A server application program instance is a process having its own address space that embodies the logic of the server application program. Distributed transaction communication software on the server system receives the service requests on multiple transaction control endpoints. A transaction control endpoint is a logical entity that is established for a service request. Transaction control related communication for a particular service request between the client application program instance and the server application program instance is directed through the associated control endpoint. Each control endpoint on which a service request is received is identified and provided to the server application program instance that processes the service request.

If a server application program instance is processing multiple service requests, the server application program instance has direct access to the associated transaction control endpoints. This allows the server application program instance to directly monitor each of the transaction control endpoints via the distributed transaction communication software. When a transaction control messages arrives, the distributed transaction communication software returns the necessary information and control to the server application program instance to process the transaction control message. No interprocess communication is required between the distributed transaction communication software and the server application program instance once a transaction control endpoint is established because the server application program instance uses program callable functions of the distributed transaction communication software to directly send and receive messages over the transaction control endpoint.

A deadlock scenario is not allowed to develop between two different server application programs, each of which requests the services of the other, during the prepare, commit, or rollback phases of processing the global transaction. A deadlock scenario in which a first server application program is waiting for a response from a second server application program, and the second server application program is waiting for a response from the first server application program, is avoided. When a server application program instance receives a transaction control directive (prepare, commit, or rollback) in a transaction control message, the server application program instance processes the directive for all service requests that it processed and then forwards the transaction control directive to any subordinate server application programs. When subsequent transaction control messages arrive for the other service requests processed by the server application program instance, a response is immediately returned to the superior.

Overall, processing overhead is reduced by having a single server application program instance process multiple service requests of a global transaction. However, concurrent processing of multiple service requests is permitted if a single server application program instance is unable to complete processing of a first service request before a second service request arrives. Thus, additional server application program instances are avoided unless they are necessary to avoid queuing of the service requests to a single server application program instance.

If a server application program instance has completed processing a first service request before a second service request arrives, the same server application program instance is restarted to process the second service request. However, if the server application program instance has not complete processing the first service request by the time the second service request arrives, a new server application program instance is started to process the second service request. In this manner, extra processing overhead associated with additional server application program instances is avoided, unless a single server application program instance is unable to complete processing of a service request before the next service request arrives.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

Figure 1:
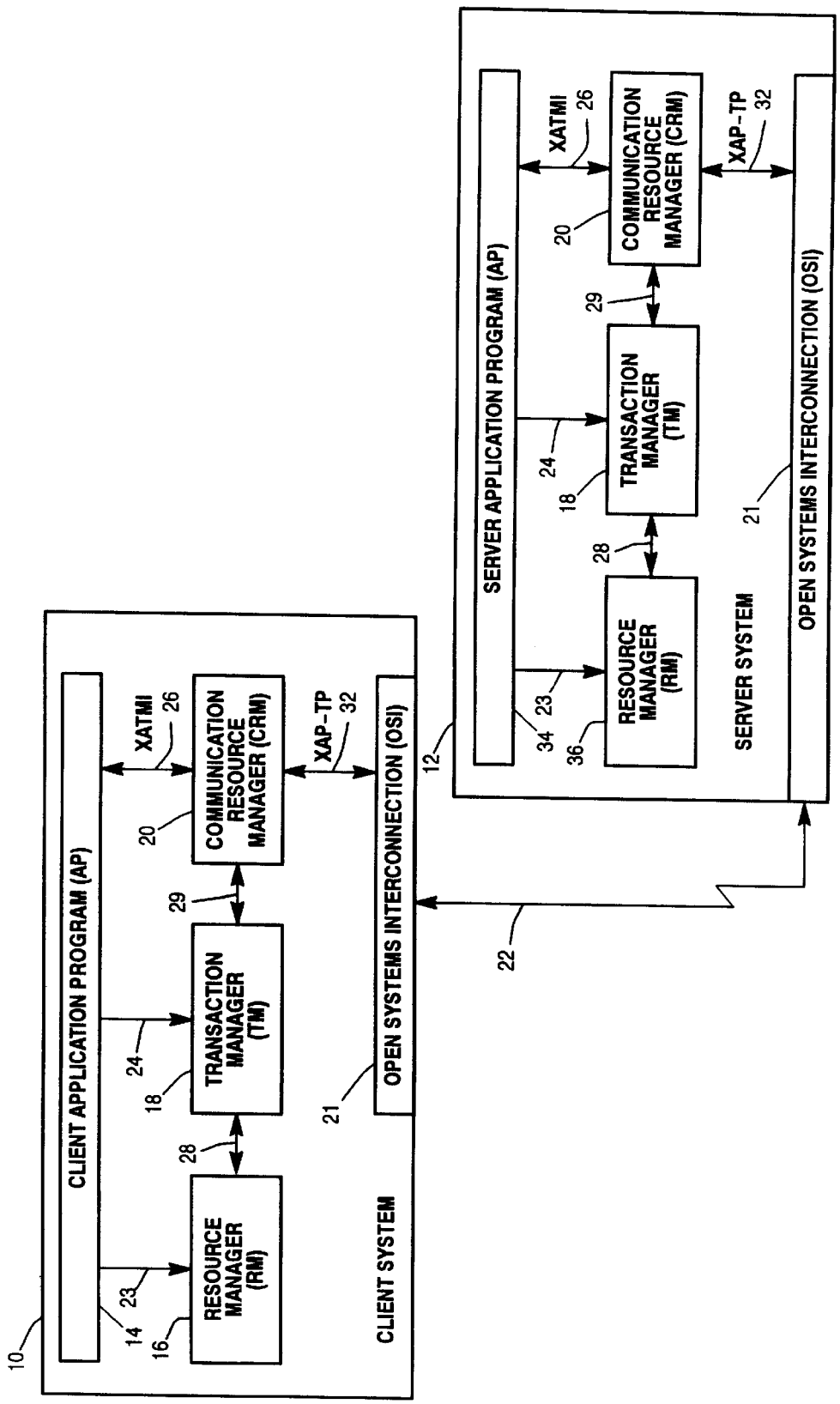
FIG. 1 is a block diagram of a Client System and a Server System.

FIG. 1 is a block diagram of a Client System 10 and a Server System 12. The Client System 10 and the Server System 12 each represent a separate data processing system. The client and server transaction processing systems are shown on separate data processing systems to assist in teaching the present invention, even though the distributed transaction processing model chosen to implement the invention permits client and server application programs on the same data processing system. The data processing system of the Client System could be a U6000 Series data processing system, and the Server System could be a 2200/500 Series data processing system, both available from Unisys Corporation.

Each of the Systems 10 and 12 is shown with and executes software that conforms to the X/Open™ Open/OLTP Distributed Transaction Processing (DTP) architecture, referenced hereafter as "Open/OLTP". X/Open™ is a trademark of X/Open Company Limited. Directional lines indicate the direction in which processing control may flow between the software components. The Open/OLTP model is a software architecture that enables multiple application programs to share resources and to participate in processing global transactions. The Open/OLTP model is more fully described in the X/Open Guide, Distributed Transaction Processing Reference Model as published by the X/Open Company Ltd., U.K.

The Client Application Program (AP) 14 is a user-defined software component that defines global transaction boundaries and specifies actions that constitute global transactions. It also provides access to one or more resources that are required by a transaction. In a global transaction, two or more APs perform their individual functions which when combined make up the global transaction. One of the APs will be the superior AP, that is the AP that starts and finishes the global transaction. The other APs will be subordinate. A hierarchy of APs may be established where a subordinate AP is superior to another AP.

A Resource Manager (RM) 16 provides access to a resource for the AP 14. The X/Open model permits multiple resource managers. Database management systems and file access systems are examples of system software components that act as RMs.

The APs begin and end transactions under the control of a Transaction Manager (TM) 18. The TM is a system software component that assigns transaction identifiers to global transactions, monitors their progress, coordinates their completion, and coordinates failure recovery. The TM enforces the transaction property of atomicity. If a global transaction is being processed, the TM adheres to the two-phase Commit transaction processing protocol.

Communication between the Client AP 14 and other APs that are participating in global transactions, and communication between the TM 18 and TMs on separate data processing systems are controlled by the Communication Resource Manager (CRMs) 20. In Open/OLTP DTP, the reference model for system components that provide the underlying communication services that the CRMs require are defined in ISO 7498 which is the ISO Reference Model for Open System Interconnection (OSI). The Open Systems Interconnection 21 provides communication services between the Client System 10 and the Server System 12. Communication Line 22 represents the physical connection between the Client and Server Systems. The Open/OLTP DTP model also supports proprietary communication protocols.

The Client AP 14 conducts a global transaction by using interfaces that system software components provide. The interfaces include: AP-RM 23, AP-TM 24, and AP-CRM 26. The AP-RM interfaces include the RM provided interfaces that provide the APs with access to resources. Examples of AP-RM interfaces include the Structured Query Language (SQL) and the Indexed Sequential Access Method (ISAM).

The AP-TM interface 24 is provided by the TM to define global transaction boundaries. The AP-TM interface is also referenced as the TX interface. Further information on the TX interface is available in *Distributed Transaction Processing: The TX (Transaction Demarcation) Specification*, X/Open Company Limited, U.K., (1992).

The AP-CRM 26 interface is provided by the CRM 20 to the Client AP 14. The AP-CRM interface is also referenced as the XATMI interface. The XATMI interface allows APs to communicate with other APs during the processing of global transactions. Additional information on the XATMI interface is available in *Distributed Transaction Processing: The XATMI Specification*, X/Open Company Limited, U.K., (1993).

The TM-RM interfaces 28 are similar to the AP-RM interfaces and are used for purposes of transaction control (preparing, Committing, or rolling back). The TM-RM Interface 28 and TM-CRM Interface 29 are described further in XA Interface, *Distributed Transaction Processing: The TX (Transaction Demarcation) Specification*, X/Open Company Limited, U.K., (1992).

The Client CRM 20 to OSI 21 Interface 28 is described in the X/Open Specification entitled *ACSE/Presentation: Transaction Processing API (XAP-TP)*. The Interface 32 is hereinafter references as XAP-TP. The XAP-TP Interface 32 and XATMI Interface 26 are described further along with FIG. 3.

The Server System 12 is shown with a Server Application Program (AP) 34. The Server AP receives a Service Request from the Client AP 14, processes the Service Request with its local Resource Manager 36, and returns a Reply to the Client AP as required.

Figure 2:
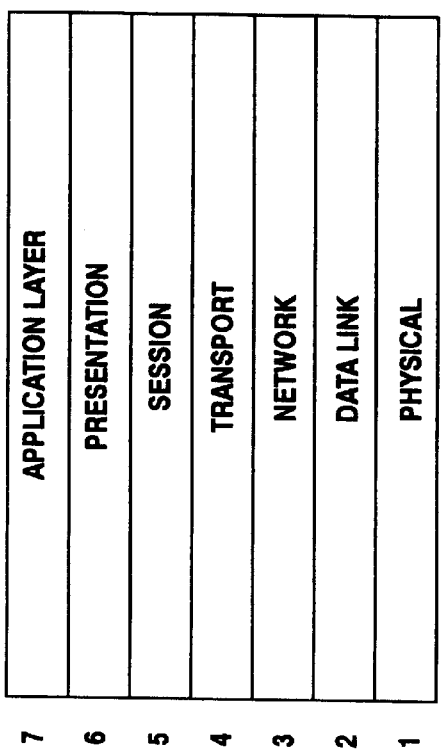
FIG. 2 illustrates the seven layers of the Open Systems Interconnection (OSI) Reference Model.

FIG. 2 illustrates the seven layers of the Open Systems Interconnection (OSI) Reference Model. The reference model is briefly described to show how the implementation of the present invention fits within the framework of OSI. The model consists of seven discrete layers that include the Application, Presentation, Session, Transport, Network, Data Link, and Physical layers. Each layer provides a defined service to the layer directly above it, and each layer relies on the defined services of the layer directly below it. Processing entities that are on separate systems and are within the same layer of the OSI model are capable of communicating without having to manage all the underlying functionality required to communicate.

The direction of data flow within the model depends upon whether data is being transmitted or received. For transmitted data, the flow is from top-to-bottom, and the flow is from bottom to top for data received.

The OSI model defines a consistent set of services and protocols for each layer. Briefly, the Application Layer serves formatted data to the Presentation Layer and receives data from the Presentation Layer for formatting for output. The Presentation layer translates data, the Session layer controls the dialogue between instances of the OSI model on separate systems, the Transport layer ensures the integrity of messages, the Network layer provides for the routing of messages, the Data Link layer detects errors in the transmission of messages, and the Physical layer physically connects the system to a network.

Figure 3:
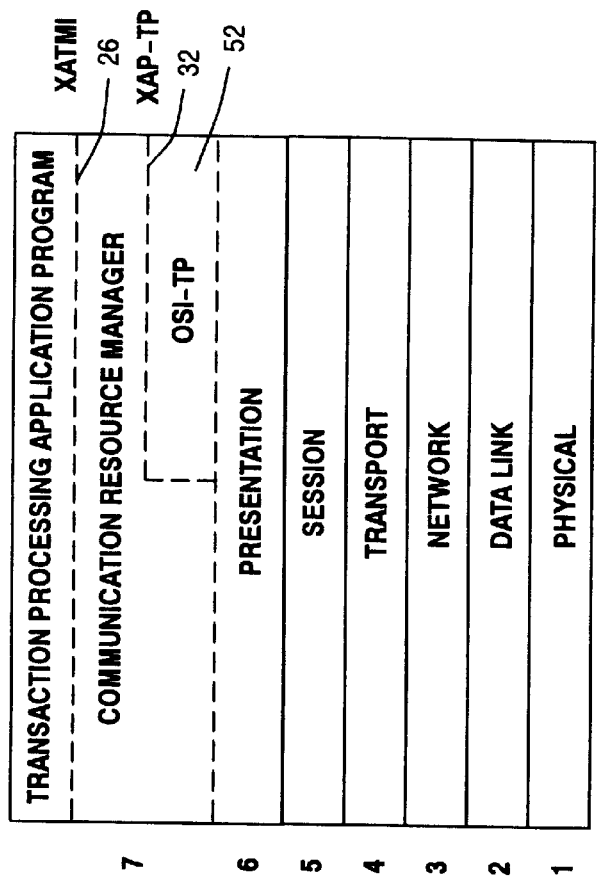
FIG. 3 shows the relationship between the OSI Reference Model of FIG. 2 and the Open/OLTP model described along with FIG. 1.

FIG. 3 shows the relationship between the OSI Reference Model of FIG. 2 and the Open/OLTP model described along with FIG. 1. When combined with the Open/OLTP model, the Application Layer of the OSI Model further includes the Transaction Processing Application Program, corresponding to the Client AP 14 and Server AP 34, and a Communication Resource Manager 20. The Application Layer further includes the OSI-Transaction Processing (OSI-TP) service element 52 which provides support and coordination for distributed transaction processing. The OSI-TP model is defined in ISO/IEC 10026-1:1992, the service in ISO/IEC 10026-2:1992, and the protocol in ISO/IEC 10026-2:1992.

The XATMI Interface 26 is shown in FIG. 3 as a dotted line separating the Transaction Processing Application Program and the Communication Resource Manager within the Application Layer. The XAP-TP Interface 32 is shown as a dashed line separating the Communication Resource Manager from the OSI-TP service element 52 and the Presentation layer. XATMI is an application programming interface from an application program to a Communication Resource Manager that allows application programs to interact using a client server relationship. XAP-TP is an application programming interface to the services provided by the OSI-TP.

Figure 4:
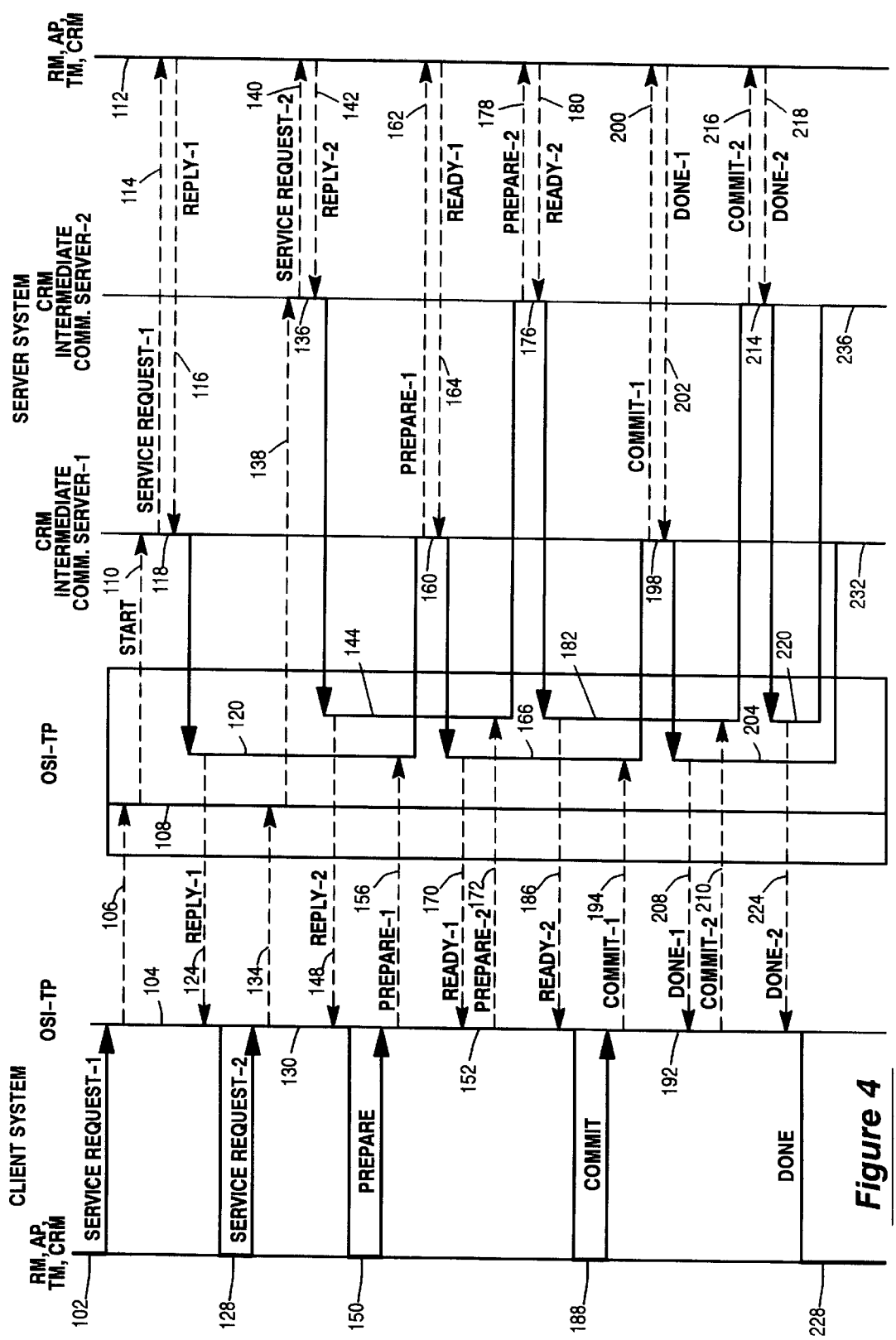
FIG. 4 shows the flow of control and data on a Client System and a Server System in processing two service requests that are generated by a Client AP for processing by a Server AP as part of a global transaction.
Figure 5:
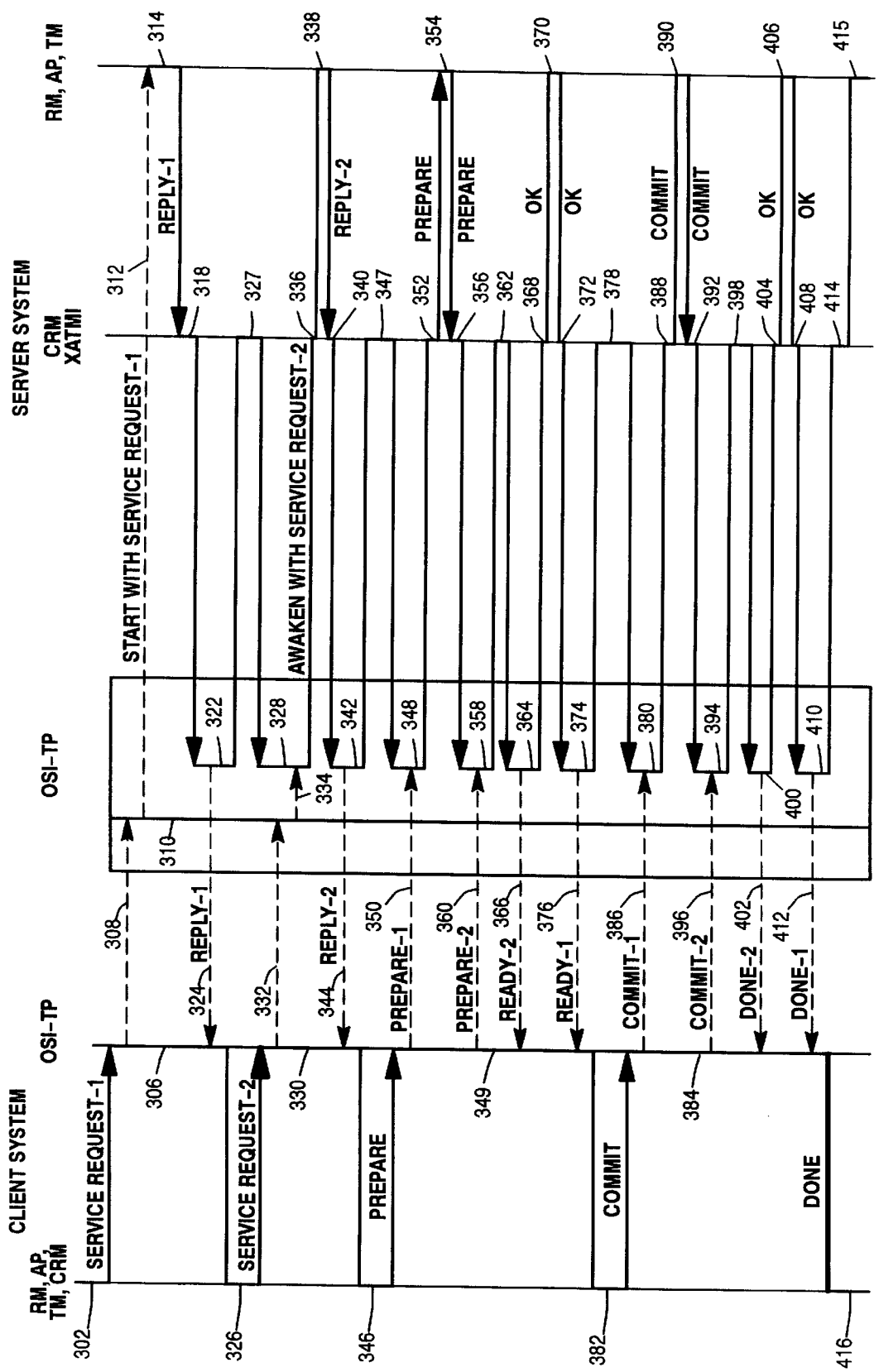
FIG. 5 illustrates the advantages achieved in applying the present invention to the example of FIG. 4.

FIGS. 4 and 5 are thread control diagrams. A thread in this description is used to illustrate the flow of process control. A single program address space may have multiple active threads of control. The software components and associated control of the Client System 10 are shown on the left side of the FIGs. and the software components and associated control of the Server System 12 are shown on the right side of the FIGs. The software boundary lines are solid, thin, and vertical and mark the processing boundary of the software component identified at the top of the line. The processing boundary of the OSI-TP service element 52 on the Server System is represented as a gray block to accommodate multiple threads of control within the software. A Control Thread is a series of solid, thick lines that are connected end-to-end. The individual lines within a Control Thread may be vertical or horizontal. When a line within a Control Thread is vertical, the software component identified at the top of the corresponding boundary line has control. When a line within a Control Thread is horizontal, control is being transferred to another software component. Directional lines of a thread represent the invocation of the identified software component and non-directional horizontal lines of a thread represent a return of control. It should be noted that in order to assist the reader in referencing particular lines within a Control Thread, each individual line will hereinafter be referenced as Thread x, where x is a reference number. It is recognized that the accumulation of end-to-end lines constitute a single Control Thread, even though individual lines are referenced as Threads. Data transfer lines are represented by directional, dashed lines. The invocation of a separate process and thread of control is represented by a directional, dotted line.

FIG. 4 and FIG. 5 illustrate the processing of an example global transaction involving two Service Requests, each of which is to be processed by the same Server AP 34 logic. FIG. 4 shows one method for processing the global transaction and FIG. 5 shows the method of processing the global transaction according to the present invention.

FIG. 4 shows the flow of control and data on a Client System 10 and a Server System 12 in processing two Service Requests that are generated by a Client AP 14 for processing by a Server AP 34 as part of a global transaction. To simplify the illustration of the thread control, the RM 16, AP 14, TM 18, and CRM 20 of the Client System 10 are shown as one software component and may be collectively referred to as the Client AP instance. Likewise, the RM 36, AP 34, TM 18, and CRM 20 of the Server System 12 are shown as one software component and may be collectively referred to as the Server AP instance.

One method of handling multiple Service Requests that are part of one global transaction and that are to be processed by a single Server AP instance includes two Intermediate Communication Server instances, one for each Service Request. The Intermediate Communication Server instances are part of the CRM 20 of the Server System 12, and in FIG. 4 are labeled Intermediate Communication Server-1 and Intermediate Communication Server-2. Intermediate Communication Server-1 provides CRM services for the first Service Request, Service Request-1, and Intermediate Communication Server-2 provides CRM services for the second Service Request, Service Request-2.

Thread 102 represents the initial processing performed by the Client System 10 in setting up to process a global transaction. The OSI-TP Thread 104 is initiated with Service Request-1. Data transfer Line 106 shows Service Request-1 being transferred from the Client System to the Server System 12. A dedicated Thread 108 in the Server OSI-TP listens for incoming messages. A separate Intermediate Communication Server-1 process is started as indicated by dotted line 110. An Endpoint on which Thread 108 received Service Request-1 is provided to Thread 118 so that the Intermediate Communication Server-1 may listen for further transaction control messages (Prepare, Commit, or rollback and their associated response messages). An Endpoint is a communications instance that is available to receive an incoming service request or is actively part of a service request. A separate Thread 112 in the Server System is available to process Service Requests. Thus, Service Request-1 is sent for processing, via interprocess communication as represented by dashed Line 114, to the software of Thread 112. Upon completion of processing Service Request-1, a Reply-1 message is sent, via interprocess communication as represented by dashed Line 116, from Thread 112 to Thread 118 of the CRM Intermediate Communication Server-1. The CRM Intermediate Communication Server-1 invokes a Thread 120 in OSI-TP to send the Reply-1 message back to the Client System. Dashed Line 124 shows the return of Reply-1 to Thread 126 of the Client System. Thread 120 then waits for further transaction control messages (Prepare, Commit, rollback) associated with Service Request-1 from the Client System. Reply-1 and control are returned to Thread 128.

Thread 130 is activated with Service Request-2. Thread 130 sends Service Request-2 to the Server System 12 as shown by dashed Line 134 and then awaits a Reply message. Thread 108 receives Service Request-2 on a second Endpoint. Thread 136 of Intermediate Communication Server-2 is started as shown by dotted Line 138. Service Request-2 is sent to Thread 112 via interprocess communication as shown by dashed Line 140. Service Request-2 is processed by Thread 112 and Reply-2 is returned to Intermediate Communication Server-2 via interprocess communication as shown by dashed Line 142. When Thread 136 receives Reply-2, it invokes OSI-TP Thread 144 to send Reply-2 to the Client System. The Intermediate Communication Server-2 uses the Endpoint over which Service Request-2 was received to send Reply-2 and await transaction control messages. Reply-2 is returned to the Client System as shown by dashed Line 148 and control is eventually returned to Thread 150.

Once Reply messages for all Service Requests have been returned to the Client System 10, Thread 150 initiates processing for two-phase Commitment of the global transaction. OSI-TP Thread 152 is initiated to send a Prepare message for each of the Service Requests. Thread 152 sends Prepare-1 to the Server System 12 over the Endpoint of Service Request-1, as shown by dashed Line 156, and awaits a Ready message to indicate that Prepare-1 had been received and processed. Thread 120, listening on the Endpoint of Service Request-1, receives Prepare-1 and control is returned to Intermediate Communication Server-1 Thread 160. Thread 160 sends Prepare-1 to Thread 112, as shown by dashed Line 162, and awaits a Ready-1 message. Thread 112 returns Ready-1 via dashed Line 164 to Thread 160 upon completion of the first phase of Commitment for Service Request-1. Upon receipt of Ready-1, Thread 160 initiates Thread 166 to send Ready-1 to the Client System. As shown by dashed Line 170, Ready-1 is returned to Thread 152.

Thread 152 sends Prepare-2 to the Server System 12 over the Endpoint of Service Request-2, as shown by dashed Line 172, and awaits a Ready message to indicate that Prepare-2 had been received and processed. Thread 144, listening on the Endpoint of Service Request-2, receives Prepare-2 and control is returned to Intermediate Communication Server-2 Thread 176. Thread 176 sends Prepare-2 to Thread 112, as shown by dashed Line 178, and awaits a Ready-2 message. Thread 112 returns Ready-1 via dashed Line 180 to Thread 176 upon completion of the first phase of Commitment for Service Request-2. Upon receipt of Ready-2, Thread 176 initiates Thread 182 to send Ready-2 to the Client System. As shown by dashed Line 186, Ready-2 is returned to Thread 152.

Upon return of an all-Ready status from Thread 152, Thread 188 initiates Thread 192 to begin the second phase of two-phase Commitment. Thread 192 sends Commit-1 to the Server System 12 over the Endpoint of Service Request-1, as shown by dashed Line 194, and awaits a Done message to indicate that Commit-1 had been received and processed. Thread 166, listening on the Endpoint of Service Request-1, receives Commit-1 and control is returned to Intermediate Communication Server-1 Thread 198. Thread 198 sends Commit-1 to Thread 112, as shown by dashed Line 200, and awaits a Done-1 message. Thread 112 returns Done-1 via dashed Line 202 to Thread 198 upon completion of the second phase of Commitment for Service Request-1. Upon receipt of Done-1, Thread 198 initiates Thread 204 to send Done-1 to the Client System. As shown by dashed Line 208, Done-1 is returned to Thread 192.

Thread 192 sends Commit-2 to the Server System 12 over the Endpoint of Service Request-2, as shown by dashed Line 210, and awaits a Done message to indicate that Commit-2 had been received and processed. Thread 182, listening on the Endpoint of Service s Request-2, receives Commit-2 and control is returned to Intermediate Communication Server-2 Thread 214. Thread 214 sends Commit-2 to Thread 112, as shown by dashed Line 216, and awaits a Done-2 message. Thread 112 returns Done-2 via dashed Line 218 to Thread 214 upon completion of the second phase of Commitment for Service Request-2. Upon receipt of Done-2, Thread 214 initiates Thread 220 to send Done-2 to the Client System. As shown by dashed Line 224, Done-2 is returned to Thread 192. A Done status is returned to Thread 228 to indicate that processing of the global transaction is complete.

After Thread 204 sends Done-1 to Client System 10, control is returned to Intermediate Communication Server-1 Thread 232. Because processing of Service Request-1 is complete at this point, Thread 232 terminates processing. Similarly, after Thread 220 sends Done-2 to Client System 10, control is returned to Thread 236 of Intermediate Communication Server-2. Because processing of Service Request-2 is complete at this point, Thread 236 terminates processing.

FIG. 5 illustrates the advantages achieved in applying the present invention to the example of FIG. 4. The present invention reduces the processing overhead associated with multiple Service Requests of a global transaction that are to be processed by the same Server AP 34 logic. Processing overhead is reduced in two respects. First, the Server AP is not a process that is separate from the CRM 20. Once the Server AP instance receives a Service Request, it uses program callable routines within the CRM to receive and send messages, rather than relying on the interprocess communication as shown in FIG. 4.

The second way in which the invention reduces processing overhead is the elimination of the Intermediate Communication Server instances of FIG. 4. Each Intermediate Communication Server instance adds additional system overhead processing to the Server System 12 because of having to manage multiple processes. With the present invention as applied to the example of FIG. 4, instead of having three processes on the Server System handle two Service Requests, only one process is required.

Processing of a global transaction that includes two Service Requests, Service Request-1 and Service Request-2, to Server System 12 begins at Thread 302. OSI-TP Thread 306 is initiated to send Service Request-1 to the Server System. Dashed Line 308 shows the transfer of Service Request-1 to the Server System. A Listener process Thread 310 within OSI-TP on the Server System receives Service Request-1 and starts a Server AP 34 instance as shown by dotted Line 312. Thread 314 processes Service Request-1 and initiates XATMI Thread 318 to send Reply-1 to the Client System 10. Thread 318 initiates OSI-TP Thread 322 to send Reply-1. Dashed Line 324 shows the transfer of Reply-1 to OSI-TP Thread 306 of the Client System. Thread 306 returns Reply-1 to Thread 326. OSI-TP Thread 322 returns control to XATMI Thread 327 and Thread 327 initiates OSI-TP Thread 328 to monitor the Endpoint over which Service Request-1 was received for transaction control messages.

Thread 326 initiates OSI-TP Thread 330 to send Service Request-2. Dashed Line 332 shows the transfer of Service Request-2 to OSI-TP Thread 310 of the Server System 12. Thread 310 receives Service Request-2 over an Endpoint that is distinct from the Endpoint of Service Request-1. Dotted Line 334 shows that the process associated with OSI-TP Thread 328 is awakened and control is returned to XATMI Thread 336. Thread 336 initiates Thread 338 to process Service Request-2. Thread 338 initiates XATMI Thread 340 to send Reply-2 to the Client System 10, and Thread 340 initiates OSI-TP Thread 342. Dashed Line 344 shows the transfer of Reply-2 to OSI-TP Thread 330. Reply-2 is then returned to Thread 346.

After Thread 342 sends Reply-2 control is returned to XATMI Thread 347. Thread 347 initiates OSI-TP Thread 348 to monitor the Endpoint associated with Service Request-1 and the Endpoint associated with Service Request-2.

When the Client AP 14 has received Reply messages for all Service Requests associated with the global transaction, Thread 346 initiates Thread 349 to send a Prepare transaction control message to all the Server APs 34 that are participating in processing the global transaction. OSI-TP Thread 349 sends Prepare-1 to Server System 12. Thread 350 shows the transfer or Prepare-1 to the Server System. OSI-TP Thread 348 receives Prepare-1 and control is returned to XATMI Thread 352. Thread 352 initiates Thread 354 to perform the first phase of Commitment, i.e., Prepare, for all Service Requests that are part of the global transaction. Thread 354 in turn performs the first phase of Commitment with its local Resource Managers 36 and initiates a Prepare operation in XATMI Thread 356 to indicate to any subordinates to Prepare. Issuing Prepare messages to subordinates is not shown in this FIG. to aid in readability.

Thread 356 Initiates OSI-TP Thread 358 to listen for additional incoming Prepare messages. Prepare-2 is transferred from the Client System 10 to the Server System 12 as shown by dashed Line 360. Upon receipt of Prepare-2, control is returned to XATMI Thread 362. Aware that the Prepare phase of Commitment has already been performed for Service Request-1 and Service Request-2 of the global transaction by Thread 354, Thread 362 initiates OSI-TP Thread 364 to send Ready-2 back to the Client System 10. Dashed Line 366 shows the transfer of Ready-2. OSI-TP Thread 364 returns control to XATMI Thread 368 which returns an OK status to Thread 370. Thread 370 then returns an OK status to XAMTI Thread 372. After receiving an OK status, Thread 372 initiates OSI-TP Thread 374 to send Ready-1 to the Client System. Dashed Line 376 shows the transfer of Ready-1 to the Client System. After sending Ready-1, Thread 374 returns control to XATMI Thread 378, and Thread 378 invokes OSI-TP Thread 380 to wait for further transaction control messages associated with Service Request-1 and Service Request-2.

OSI-TP Thread 349 returns an all-Ready status to Thread 382. Thread 382 initiates OSI-TP Thread 384 to commence the second phase of Commitment, i.e., sending Commit transaction control messages. Thread 384 sends Commit-1, as indicated by dashed Line 386 to the Server System 12. OSI-TP Thread 380 receives Commit-1 and control is returned to XATMI Thread 388. Thread 388 initiates Thread 390 to perform the second phase of Commitment, i.e., Commit, for all Service Requests that are part of the global transaction. Thread 390 in turn performs the second phase of Commitment with its local Resource Managers 36 and initiates a Commit operation in XATMI Thread 392 to indicate to any subordinates to Commit. Issuing Commit messages to subordinates is not shown in this FIG. to aid in readability.

Thread 392 Initiates OSI-TP Thread 394 to listen for additional incoming Commit messages. Commit-2 is transferred from the Client System 10 to the Server System 12 as shown by dashed Line 396. Upon receipt of Commit-2, control is returned to XATMI Thread 398. Aware that the Commit phase of Commitment has already been performed for Service Request-1 and Service Request-2 of the global transaction by Thread 390, Thread 398 initiates OSI-TP Thread 400 to send Done-2 back to the Client System 10. Dashed Line 402 shows the transfer of Done-2. OSI-TP Thread 400 returns control to XATMI Thread 404 which returns an OK status to Thread 406. Thread 406 then returns an OK status to XAMTI Thread 408. After receiving an OK status, Thread 408 initiates OSI-TP Thread 410 to send Done-1 to the Client System. Dashed Line 412 shows the transfer of Done-1 to the Client System. After sending Done-1, Thread 410 returns control to XATMI Thread 414, and Thread 414 returns control to Thread 415 where the Server AP 34 eventually completes its processing. OSI-TP Thread 384 returns an all-Ready status to Thread 416 where Client AP 14 specific processing proceeds.

Before proceeding with the discussion of the detailed description, a brief description of a transaction tree is presented to assist the reader in understanding some terminology related to global transaction processing.

Figure 6:
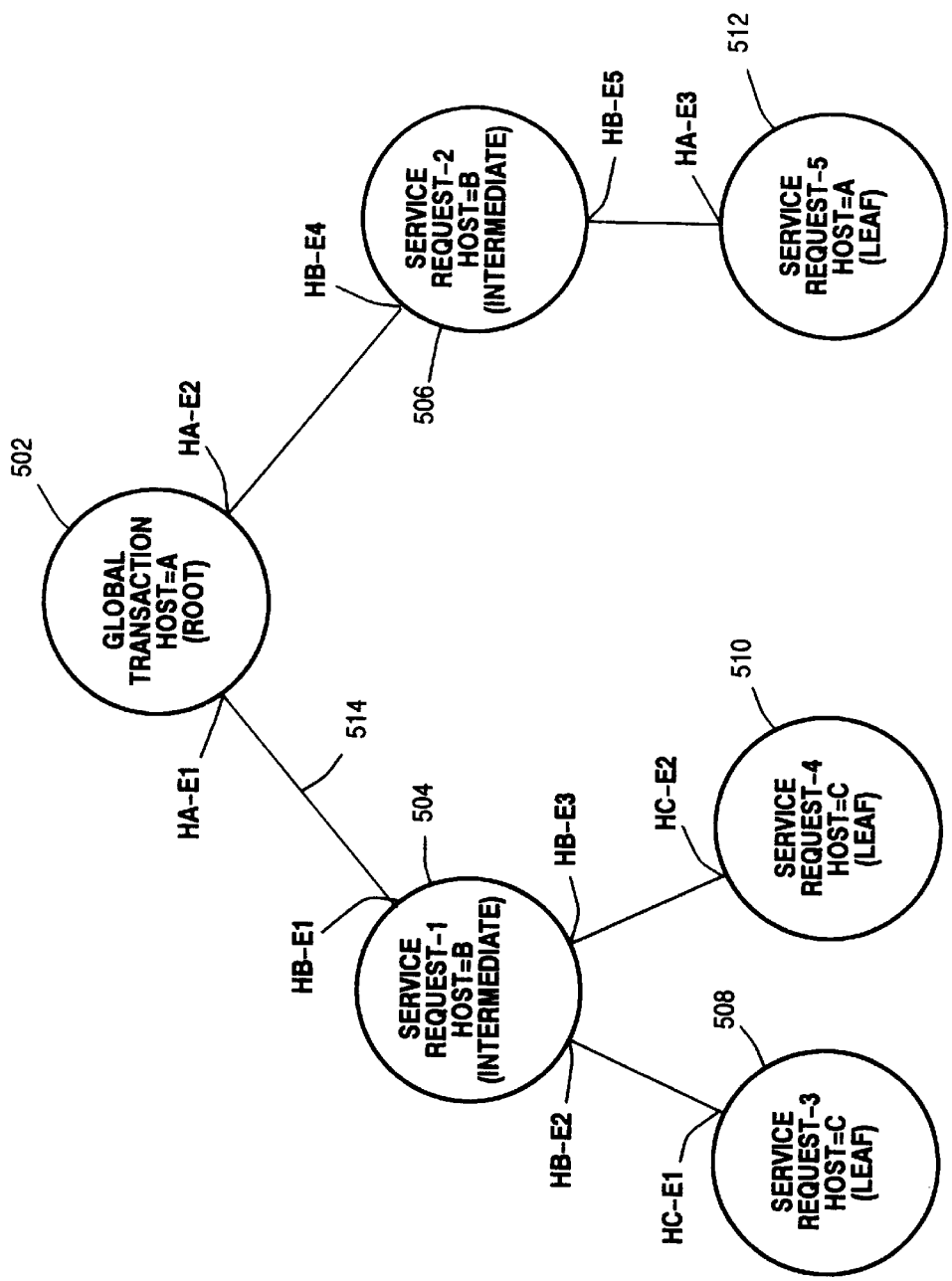
FIG. 6 is an example transaction tree.

FIG. 6 is an example transaction tree. A transaction tree is commonly used to represent the processing entities involved in processing a global transaction. A transaction tree consists of nodes connected by transaction branches. The circles in FIG. 6 represent nodes and the lines that connect the circles are the transaction branches. Each node represents the invocation of a transaction processing service and each transaction branch represents the dialogue between two nodes. A dialogue is the communication that takes place between two nodes when processing a global transaction.

A superior node is a node that initiates a dialogue. The root is a node that has no superior node and coordinates Commitment of the global transaction. A subordinate node is a node with which a dialogue is established. A leaf is a subordinate node that has no subordinate nodes.

OSI-TP service element 52 uses an Atomic Action IDentifier (AAID) to uniquely identify a global transaction. A single AAID applies to the entire transaction tree. The AAID is used to associate Service Requests with the global transaction of which they are a part.

The example of FIG. 6 has each of the nodes identified by a particular Service Request with Node 502 being the root node of the global transaction. The global transaction is initiated by a Client AP 14 on a System 10 designated as Host A. The root Node 502 initiates two Service Requests, Service Request-1 and Service Request-2, which are labeled respectively as Nodes 504 and 506. Both Service Request-1 and Service Request-2 are provided by a Server AP 34 on Server System 12, designated as Host B, and are referred to as Intermediate Nodes. Processing of Service Request-1 results in the initiation of Service Request-3 and Service Request-4 on Host C as shown by Nodes 508 and 510. Nodes 508 and 510 are leaf nodes. As shown by Node 512, Service Request-2 initiates Service Request-5 which is provided on Host A.

Each dialogue between a superior and subordinate node consists of two Endpoints: an Endpoint on the superior node and an Endpoint on the subordinate node. An Endpoint is provided to a program by the OSI-TP service element 52. A program may thereafter monitor the Endpoint for arriving messages and send messages on the Endpoint. Each Endpoint in the diagram is identified by a mnemonic consisting of HHost Identifier-EEndpoint No. For example, Branch 514 has Endpoints HA-E1 and HB-E1. A unique Endpoint is established within each Host for each branch of the transaction tree known to that Host.

An Endpoint may be established as a Control Endpoint, a Dialogue Endpoint, or a Control-and-Dialogue Endpoint. A Control-type Endpoint may only be used for sending and receiving transaction control messages and responses thereto. A Dialogue-type Endpoint may be used for general message exchanges, and a Control-and-Dialogue Endpoint may be used for both types of messages.

Figure 7:
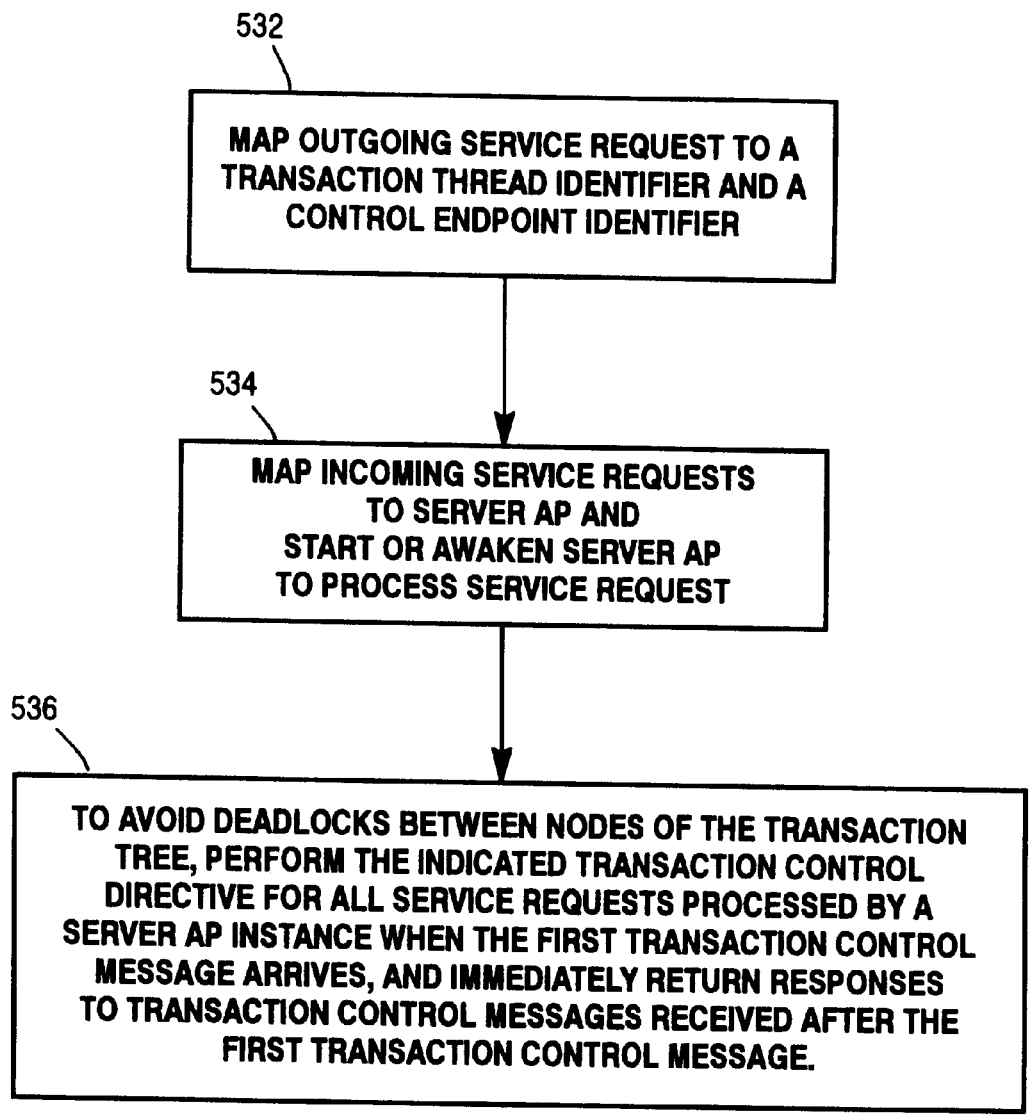
FIG. 7 is a flowchart of the overall processing used to implement the present invention.

FIG. 7 is a flowchart of the overall processing used to implement the present invention. The first Step 532 is to map outgoing Service Requests to a Transaction Thread Identifier and a Control Endpoint Identifier. This mapping allows a single Server AP instance to process multiple Service Requests as part of a global transaction without the use of multiple intermediate communication server instances, and permits the sharing of database locks in processing multiple Service Requests.

The Transaction Thread Identifier is the thread identifier that is assigned by the CRM 20 when a Client AP 14 invokes the services of the CRM. The thread identifiers are used by the shared software subsystem CRM to manage its resources for the processes using the services of the CRM. While thread identifiers are typically a data type of integer, a mnemonic is used in the example of FIG. 6 for readability. The mnemonic is of the form $H_{Host\ Identifier}T_{Thread\ Identifier}$. For a global transaction, the Transaction Thread Identifier will be the same for each subordinate node within a single System 10 or 12. The Transaction Thread Identifier for Node 502 is $H_A T_1$.

The Control Endpoint Identifier identifies the Control-type Endpoint over which transaction control messages will be sent and received for a node in a transaction tree. For the example of FIG. 6, Node 502 opens two Endpoints, HA-E1 and HA-E2, wherein HA-E1 is a Control-and-Dialogue Endpoint and HA-E2 is a Dialogue Endpoint. When Services Request-1 and Request-2 are issued, the same Control Endpoint Identifier is used for sending and receiving transaction control messages for both Service Requests. Therefore, HA-E1 is used as the Control Endpoint Identifier for sending and receiving transaction control messages for both Service Request-1 and Service Request-2 for Node 502. If a superior node issues two service requests to two separate data processing systems, the same Control-type Endpoint is used by the superior node for communicating with both subordinate nodes.

As applied to the example of FIG. 6, Step 532 results in the mapping of Service Request-1 and Service Request-2 to Control Endpoint HA-E1 and to Transaction Thread Identifier $H_A T_1$ at Host A.

Step 534 maps Service Requests that are incoming to a Host to a Server AP instance 34 that is local to the Host and starts or awakens the Server AP instance to process the Service Request. A Control-and-Dialogue Endpoint is provided to the Server AP instance for the exchange of transaction control messages with superior node and subordinate nodes.

The mapping of an incoming Service Request to a local Server AP instance is illustrated with reference to the example of FIG. 6. The OSI-TP service element 52 includes an AAID along with each Service Request it sends. For the first Service Request that is part of a particular global transaction and that is to be processed by a Server AP instance, a mapping is established from the global transaction to the Server AP instance that is to process the Service Request. This mapping is accomplished by associating the AAID of the global transaction with the thread identifier of the Server AP instance that is to process the Service Request. This thread identifier is referred to as the Transaction Thread Identifier. For Node 504 and the processing of Service Request-1, the Transaction Thread Identifier is $H_BT_1$. The same Transaction Thread Identifier applies to Node 506 and the processing of Service Request-2. In the implementation of the invention, for all Service Requests that are part of the same global transaction and that are forwarded to the CRM 20 of a particular Server System 12, only a single Server AP may be involved in processing the Service Requests from the time that a resource is initially updated until the time the second phase of Commitment is complete. However, multiple Server AP instances may be initiated to process the Service Requests if necessary.

If the Server AP 34 instance that is to process the Service Request is available, i.e., it has completed processing any prior Service Requests, the instance identified by the AAID to Transaction Thread Identifier is awakened to process the Service Request. Otherwise, an additional copy of the Server AP instance is started to process the Service Request.

The Control-and-Dialogue Endpoint is provided to the Server AP instance and may be illustrated with reference to FIG. 6. Endpoint HB-E1 is a Control-and-Dialogue Endpoint that is provided for processing Service Request-1. HB-E2 and HB-E3 are Dialogue Endpoints that are respectively established for Service Request-3 and Service Request-4. Endpoint HB-E1 is used for sending and receiving all transaction control messages for Node 504. At Node 506, a separate Control-and-Dialogue Endpoint, HB-E4, is provided because: (1) multiple service requests belonging to different global transactions may arrive nearly simultaneously; (2) there is no guarantee that all incoming service requests for a global transaction will be directed to the correct Dialogue Endpoint: and (3) each incoming service request is put into a separate transaction tree node that must be identified when processing transaction control messages.

When Node 506 initiates Service Request-5 to Host A, Node 506 uses HB-E4 as its Control Endpoint, and Node 512 establishes a new Control Endpoint HA-E3. Nodes 502 and 512 have the same Transaction Thread Identifier, HATI, because the Service Request-S is directed to a Server AP instance on Host A.

To avoid deadlocks between nodes of the transaction tree, Step 536 performs the transaction control directive (Prepare, rollback, Commit) specified in the first received transaction control message for all for all Service Requests that were processed by the Server AP instance. When transaction control messages that are associated with other Service Requests arrive, a response is immediately returned to the superior node. The response to the first transaction message sent by the superior node is returned after all the expected transaction control messages have been received.

Figure 8:
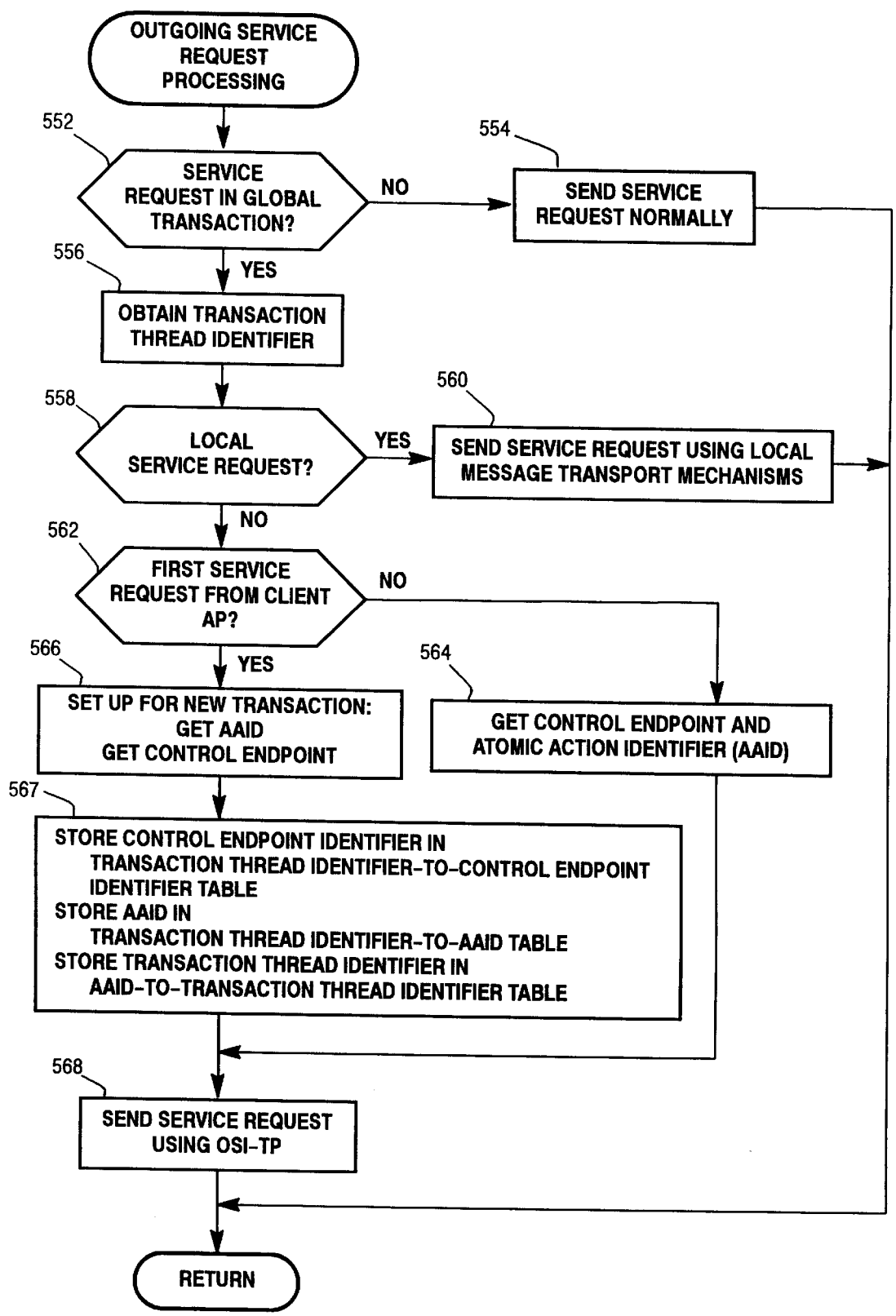
FIG. 8 is a flowchart of the processing of an outgoing service request by the client Communication Resource Manager (CRM)

FIG. 8 is a flowchart of the processing of an outgoing Service Request by the Client System 10 Communication Resource Manager (CRM) 20. The processing of FIG. 8 corresponds to Step 532 of FIG. 7.

When the CRM 20 is invoked by the Client AP instance 14 to send a Service Request, the CRM first tests whether the Service Request is part of a global transaction as shown by decision Step 552. In submitting a Service Request, the Client AP instance specifies whether the Service Request is part of a global transaction. If the Service Request is not part of a global transaction, Step 554 sends the Service Request without further processing by the CRM.

Step 556 obtains the Transaction Thread Identifier for the Client AP instance 14 if the Service Request is part of a global transaction. Because the CRM 20 is a software subsystem that may be shared between different Client APs, it assigns and maintains a list of thread identifiers, with a thread identifier for each different Client AP that has initiated the CRM.

Decision Step 558 tests whether the Service Request is directed to a local Server AP. A local Server AP is a program that is available on the same data processing system as the Client AP 14. Note that the Server AP 34 of FIG. 1 is a remote Server AP. If the Server AP is local, control is directed to Step 560 to send the Service Request. The Service Request is sent without using the OSI-TP transfer facilities. This avoids the unnecessary overhead processing involved in sending a Service Request via the OSI layers.

Control is directed to decision Step 562 if the Service Request is directed to a remote Server AP 34. Decision Step 562 tests whether the Client AP 14 has previously issued a Service Request to any remote Server System 12. This is accomplished with the Transaction Thread Identifier-to-Control Endpoint Identifier Table of FIG. 9

Figure 9:
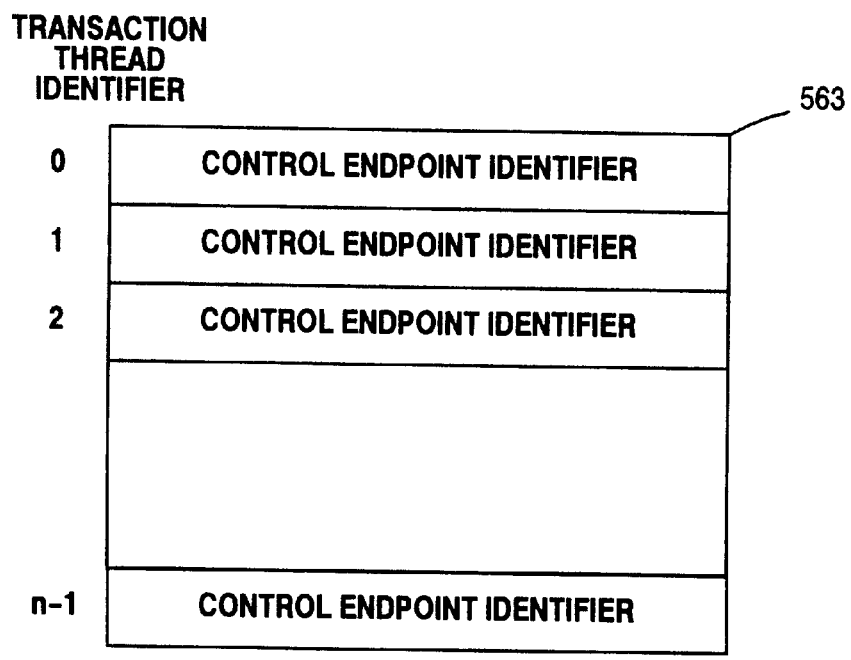
FIG. 9 shows the Transaction Thread Identifier-to-Control Endpoint Identifier Table.

FIG. 9 shows the Transaction Thread Identifier-to-Control Endpoint Identifier Table 563. The Transaction Thread Identifier-to-Control Endpoint Identifier Table contains a mapping of Control Endpoint Identifiers to Transaction Thread Identifiers. The table is indexed by the Transaction Thread Identifier and each entry contains either a Control Endpoint Identifier or is empty. The Control Endpoint Identifier identifies the Control Endpoint for a node in the transaction tree of the global transaction. If there is a Control Endpoint Identifier in the entry corresponding to the Transaction Thread Identifier used to index the table, the Control Endpoint Identifier identifies the Control Endpoint established for use with a previously issued Service Request.

Returning to Step 562 of FIG. 8, if the entry in the Transaction Thread Identifier-to-Control Endpoint Identifier Table indexed by the Transaction Thread Identifier of Step 556 is not empty, there was a prior Service Request issued and control is directed to Step 564. Step 564 obtains the Control Endpoint Identifier from the Transaction Thread Identifier-to-Control Endpoint Identifier Table and the Atomic Action IDentifier (AAID) from the Transaction Thread Identifier-to-AAID Table of FIG. 10 and directs processing to Step 568 to send the Service Request. The Control Endpoint is provided to the OSI-TP service element 52 for sending and receiving transaction control messages.

Figure 10:
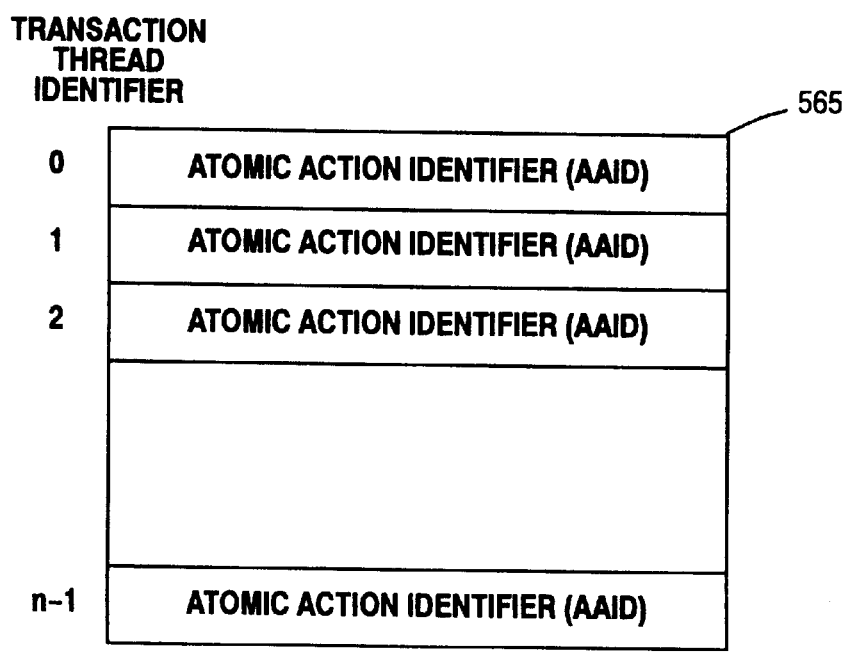
FIG. 10 shows the Transaction Thread Identifier-to-AAID Table.

FIG. 10 shows the Transaction Thread Identifier-to-AAID Table 565. The Transaction Thread Identifier-to-AAID Table maps AAIDs to Transaction Thread Identifiers. The table is indexed by Transaction Thread Identifiers and each entry in the table contains the AAID of the global transaction in which the Server AP 34 having the Transaction Thread Identifier is participating. The AAID is a character string that is assigned by the OSI-TP service element 52 when the Client AP that is associated with the root node of a transaction tree begins the global transaction. The AAID is included in all Service Requests to the remote Server APs to which the Service Requests are directed.

Returning to Step 562 of FIG. 8, control is directed to Step 566 if the present Service Request is the first to be issued by the Client AP instance 14. Step 566 sets up for a new transaction by obtaining a new AAID from the OSI-TP service element 52 and obtaining a Control-and-Dialogue Endpoint, also from the OSI-TP service element, that is used as the Control Endpoint Identifier. Step 567 stores the Control Endpoint Identifier in the Transaction Thread Identifier-to-Control Endpoint Identifier Table of FIG. 9, stores the AAID in the Transaction Thread Identifier-to-AAID Table of FIG. 10, and stores the Transaction Thread Identifier in the AAID-to-Transaction Thread Identifier Table of FIG. 11.

Step 568 sends the Service Request using the OSI-TP service element 52 to the designated Server AP 34 using the Control-and-Dialogue Endpoint obtained in Step 566. The Service Request includes the AAID. Control is then returned to await more Service Requests.

Figure 11:
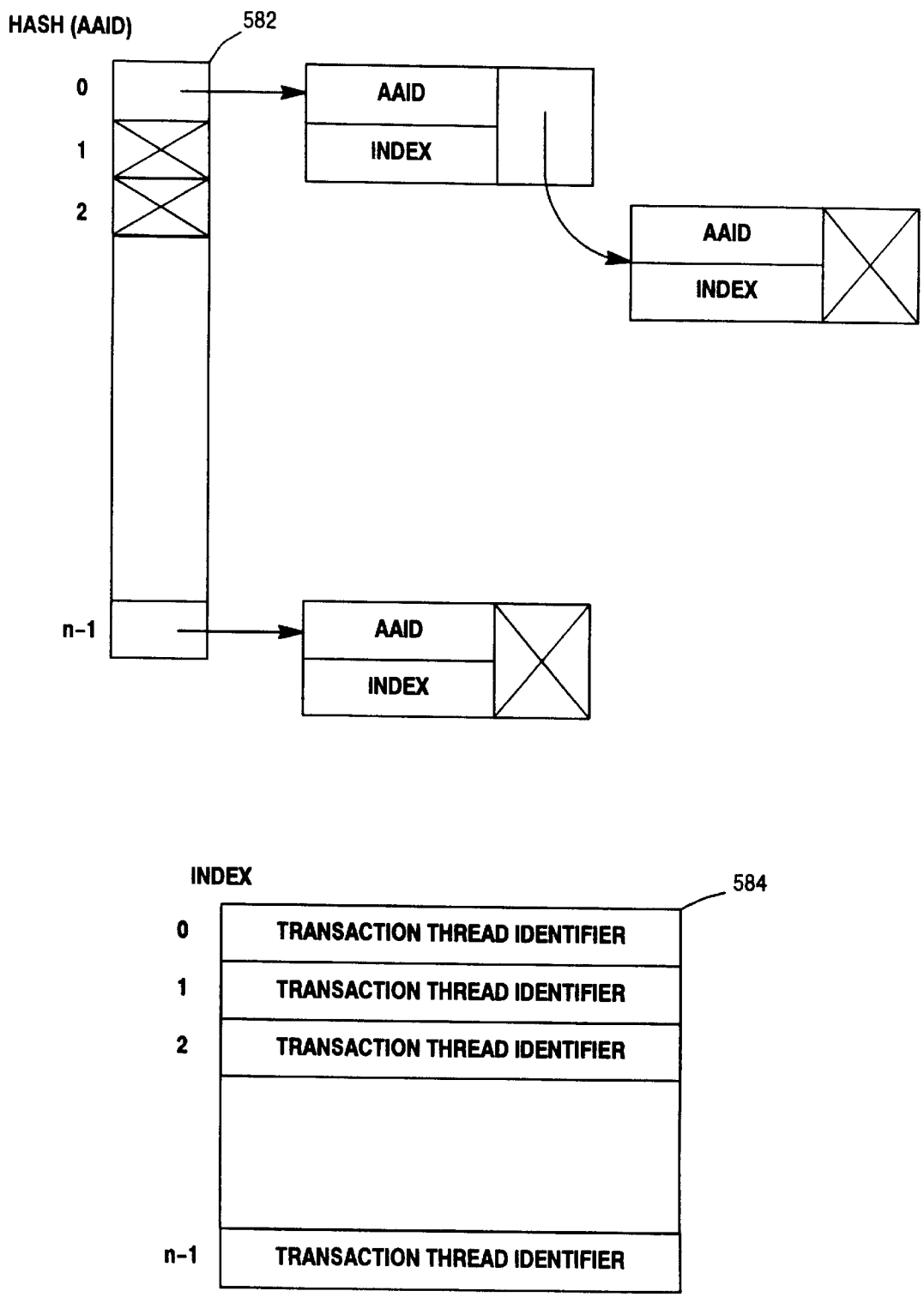
FIG. 11 shows the Atomic Action IDentifier (AAID) to-Transaction Thread Identifier Table.

FIG. 11 shows the Atomic Action IDentifier (AAID)-to-Transaction Thread Identifier Table. The AAID-to-Transaction Thread Identifier Table maps Transaction Thread Identifiers to AAIDs. Given an input AAID, an existing Transaction Thread Identifier may be determined.

The AAID-to-Transaction Thread Identifier Table consists of a first Structure 582 and a second Structure 584. The first Structure is indexed by applying a hash function to an AAID. The hash function the summation of the characters in the AAID modulus n-1. Each entry in the first Structure references a linked list of elements containing an AAID and an associated Index. The Index is used to index an entry in the second Structure which contains the Transaction Thread Identifier.

Each entry in the second Structure 584 contains either a Transaction Thread Identifier or is empty. Empty entries are available to use to store new Transaction Thread Identifiers. Each of the Transaction Thread Identifiers identifies a Server AP 34 that is processing a Service Request as part of the global transaction identified by the AAID.

For the first Service Request issued from a node for a global transaction, a mapping in the AAID-to-Transaction Thread Identifier Table is established as follows. An empty entry in the second Structure 584 is located and then updated with the new Transaction Thread Identifier. The hash function is applied to the AAID to establish an index into the first Structure 582. A new element is added at the end of the list of AAID/Index elements whose head is referenced by the index into the first Structure. The new element contains the new AAID and the newly allocated Index.

Figure 12:
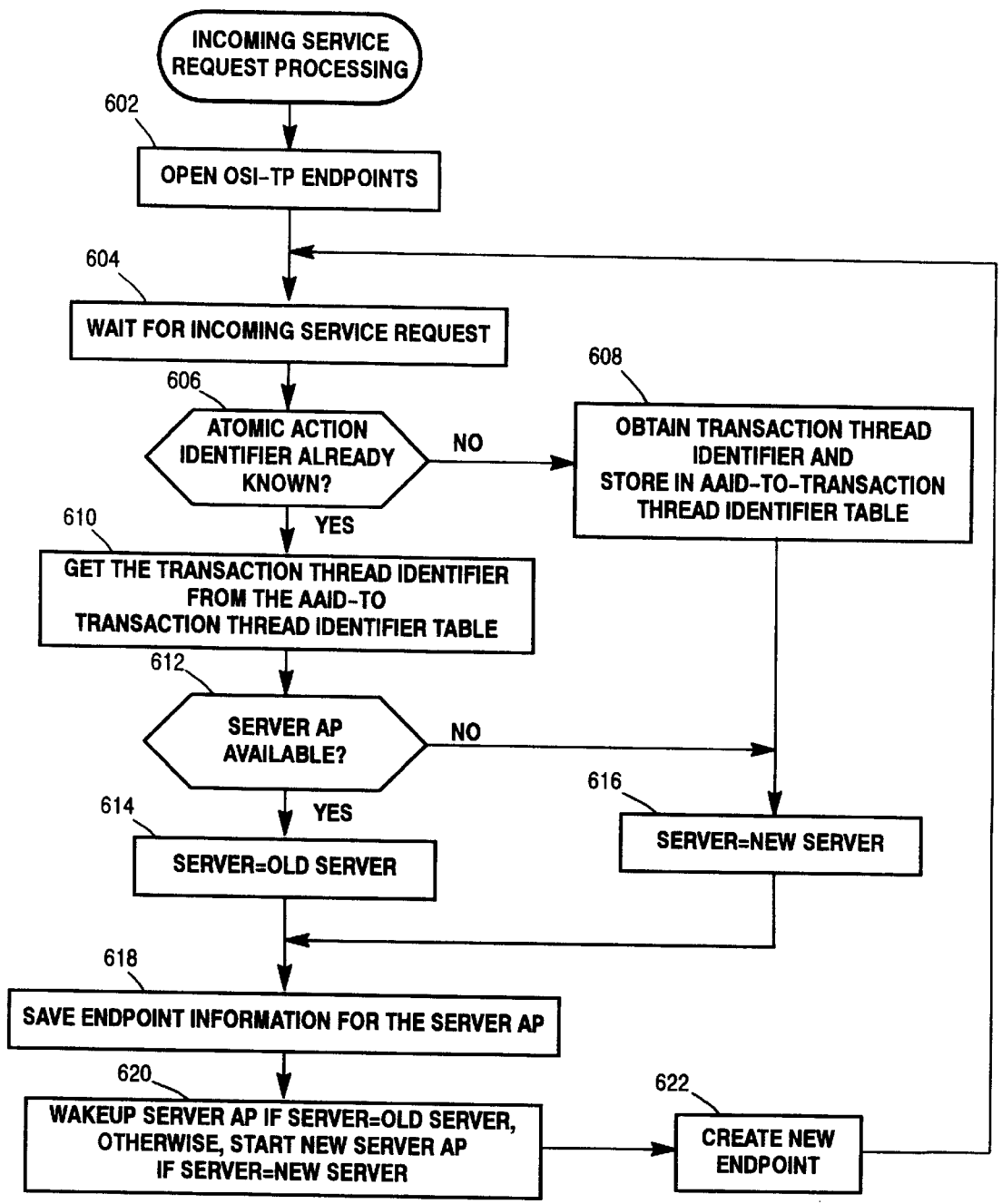
FIG. 12 is a flowchart of the processing of an incoming service request by the Communication Resource Manager (CRM) 20 of the Server System.

FIG. 12 is a flowchart of the processing of an incoming Service Request by the Communication Resource Manager (CRM) 20 of the Server System 12. The processing of FIG. 12 corresponds to Thread 310 of FIG. 5.

Step 602 opens ten (the number may vary according to configuration parameters and usage) Control-and-Dialogue Endpoints with the OSI-TP service element 52. Each Endpoint is available for two-way communication between a CRM 20 on the Server System 12 and a CRM on the Client System 10. For each of the Endpoints, an identifier is returned. Step 604 waits to receive a Service Request. Upon receiving a Service Request, processing is directed to decision Step 606.

Decision Step 606 tests whether the Atomic Action IDentifier (AAID) included in the Service Request is already associated with a Transaction Thread Identifier. This is determined by using the AAID to-Transaction Thread Identifier Table of FIG. 11. The AAID-to-Transaction Thread Identifier Table is used as follows: The hash function is applied to the AAID to obtain an index into the first Structure 582. If the entry reference the head of a list of AAID/Index elements is not null, the list is traversed in search of a matching AAID. Otherwise, decision Step 606 fails and control is directed to Step 608. If a matching AAID is found in the list, the corresponding Index is obtained and used to reference the second Structure 584. The entry in Structure 584 contains the Transaction Thread Identifier corresponding to the AAID and decision Step 606 directs control to Step 610 because the AAID was already known.

Step 610 obtains the Transaction Thread Identifier that is mapped to the AAID as explained above and processing proceeds to decision Step 612.

Decision Step 612 tests whether the Server AP instance 34 that is referenced by the Transaction Thread Identifier is available to process another Service Request. A Server AP instance is available to process another Service Request only if it is not presently processing a Service Request, i.e., the Server AP instance has sent a Reply message to the Client AP 14. The Server AP goes through various states as it services a request. The state of a Server AP is accessible to both the Listener Thread 310, a local Client APs14, and the Server AP. A list of Server APs waiting for service requests is traversed. If a Server AP is found with the same Transaction Thread Identifier as the current request, it is activated to process the service request. If a Server AP instance is available to process the Service Request, control is directed to Step 614. Step 614 sets a local variable to Old Server to signal that an existing Server AP instance may process the Service Request.

Returning to Step 606, if the Service Request is the first received for an AAID, Step 608 obtains a new Transaction Thread Identifier and stores the Transaction Thread Identifier in the AAID-to-Transaction Thread Identifier Table as described above. Processing proceeds to Step 616 where the local variable is set to New Server. Control is then directed to Step 618.

Step 618 saves Endpoint information for the Endpoint over which the Service Request was received. The Endpoint is then accessed to obtain the Service Request and may be monitored for further transaction control messages. At Step 620 the Server AP 14 that is identified by the Transaction Thread Identifier of Step 610 is awoken if the local variable is Old Server, otherwise, a new Server AP instance is started to process the Service Request. Processing proceeds to Step 622 where a new Endpoint is created to replace the Endpoint used for the Service Request just received and processing continues at Step 604.

Figure 13:
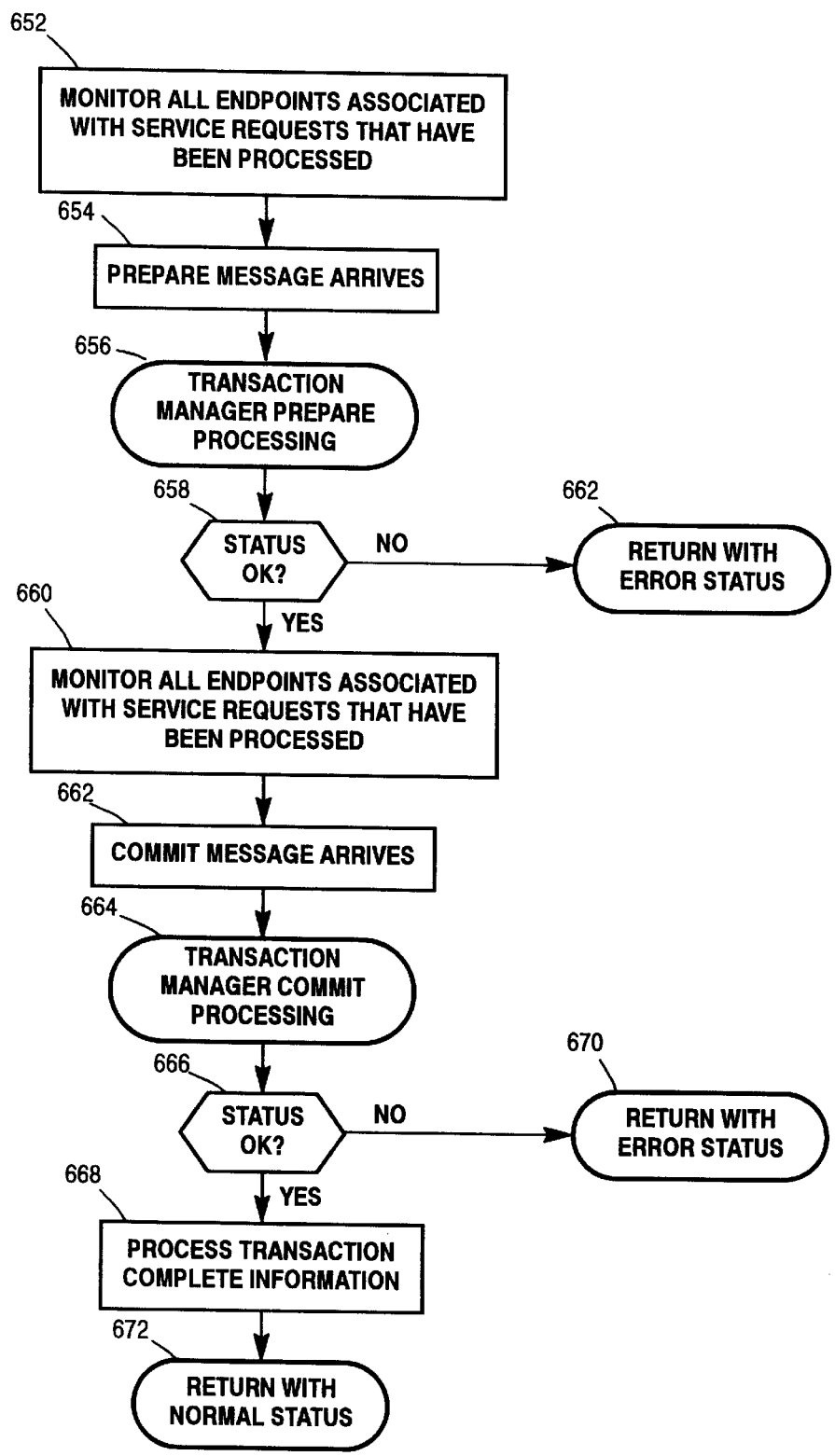
FIG. 13 is a flowchart that more particularly describes the processing commencing with Thread 348 of FIG. 5.

FIG. 13 is a flowchart that more particularly describes the processing commencing with Thread 348 of FIG. 5. Step 652 monitors the Control Endpoints for the Service Requests that have been processed by the Server AP 34. When the first Prepare message arrives, Step 654 directs control to Step 656 where the Transaction Manager 18 of the Server System 12 is invoked to perform Prepare processing. Transaction Manager Prepare Processing issues a Prepare directive to a Resource Manager 36 local to the Server System 12 and issues Prepare messages to any subordinate nodes. Control is not returned from the Transaction Manager Prepare Processing until all the Prepare messages corresponding to all the Service Requests processed by the Server AP have been received. If the status returned from the Transaction Manager Prepare Processing is OK, decision Step 658 directs control to Step 660. Otherwise, control is directed to Step 662 where control is returned with an error status.

Step 660 monitors all Control Endpoints that are associated with Service Requests that are part of the global transaction and that have been processed by the Server AP 34. When a Commit message arrives, Step 662 directs control to Step 664 where the Transaction Manager Commit Processing is invoked. Transaction Manager Commit Processing issues a Commit transaction control message to a Resource Manager 36 local to the Server System 12 and issues Commit messages to any other subordinate nodes. Control is not returned from the Transaction Manager Commit Processing until all the Commit messages corresponding to all the Service Requests processed by the Server AP have been received. If the status returned from the Transaction Manager Commit Processing is OK, decision Step 666 directs control to Step 668. Otherwise, control is directed to Step 670 where control is returned with an error status. Step 672 returns control with a normal status to the Server AP instance.

Figure 14:
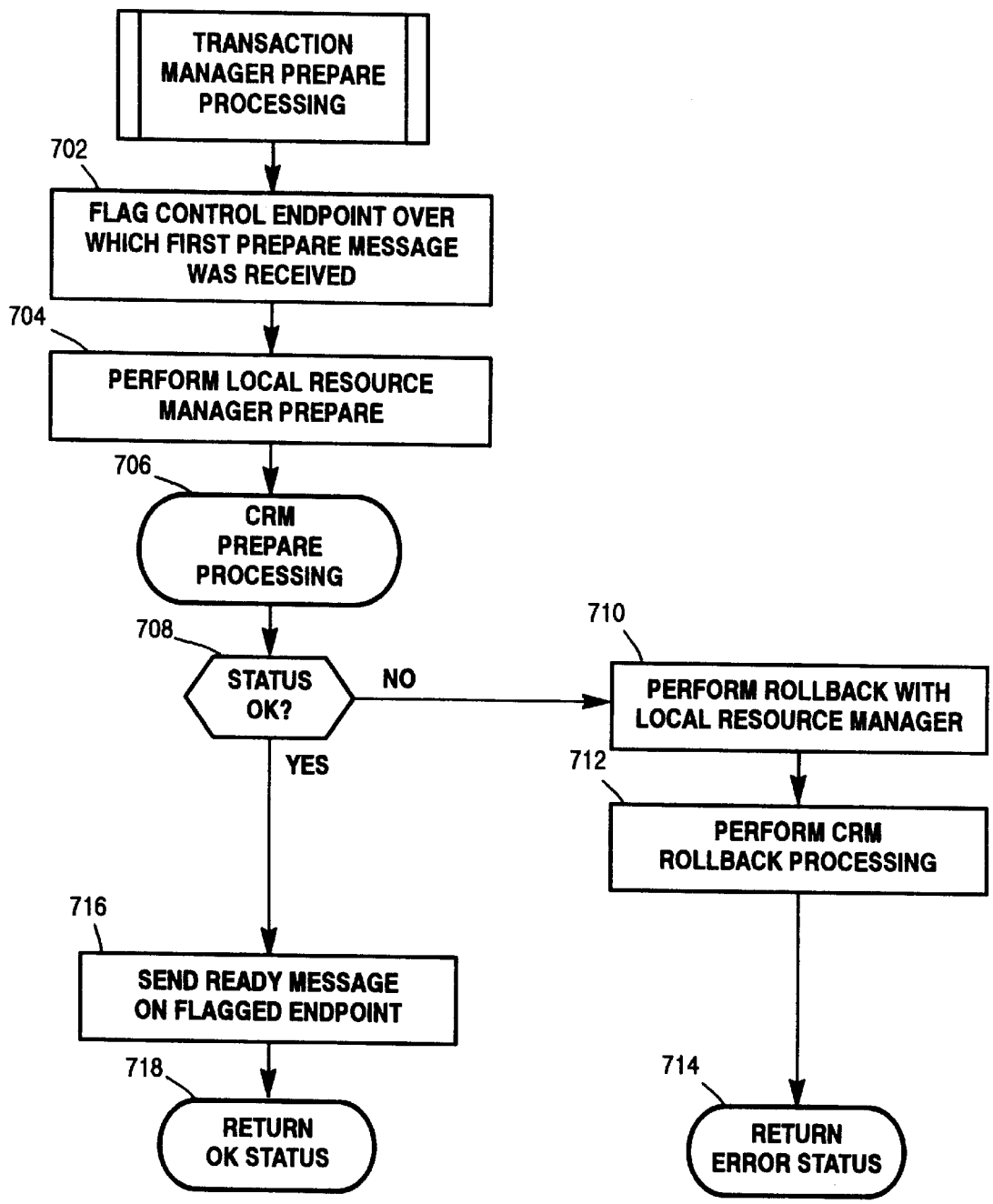
FIG. 14 is a flowchart of the Transaction Manager Prepare Processing of the Server System.

FIG. 14 is a flowchart of the Transaction Manager Prepare Processing of the Server System 12. Step 702 flags the Control Endpoint over which the first Prepare message was received. The Control Endpoint over which the first Prepare message was received is no longer monitored for a Prepare message and is the last Endpoint over which a Ready message is returned to the Client System 10. Step 704 performs Prepare processing with the Resource Manager 36 that is local to the Server System 12. The local Resource Manager performs a Prepare for all the Service Requests that it processed as part of the global transaction.

Step 706 invokes the CRM Prepare Processing. The CRM Prepare Processing issues Prepare messages to subordinate nodes of the Server AP 34, and awaits further Prepare messages from the Client System 10. Control does not return from the CRM Prepare Processing until all expected Prepare messages have been received from the Client System and all expected Ready messages have been received from subordinate nodes.

Decision Step 708 tests whether an OK status was returned from the CRM Prepare Processing of Step 706. If not, control is directed to Step 710. Step 710 instructs the local Resource Manager to perform a rollback for all Service Requests associated with the global transaction. Step 712 invokes the CRM to perform rollback, and Step 714 returns an error status to the superior node.

If the status returned from CRM Prepare Processing is OK, control is directed to Step 716. Step 716 sends a Ready message on the Endpoint that was flagged at Step 702, and Step 718 returns control with a status of OK.

Figure 15:
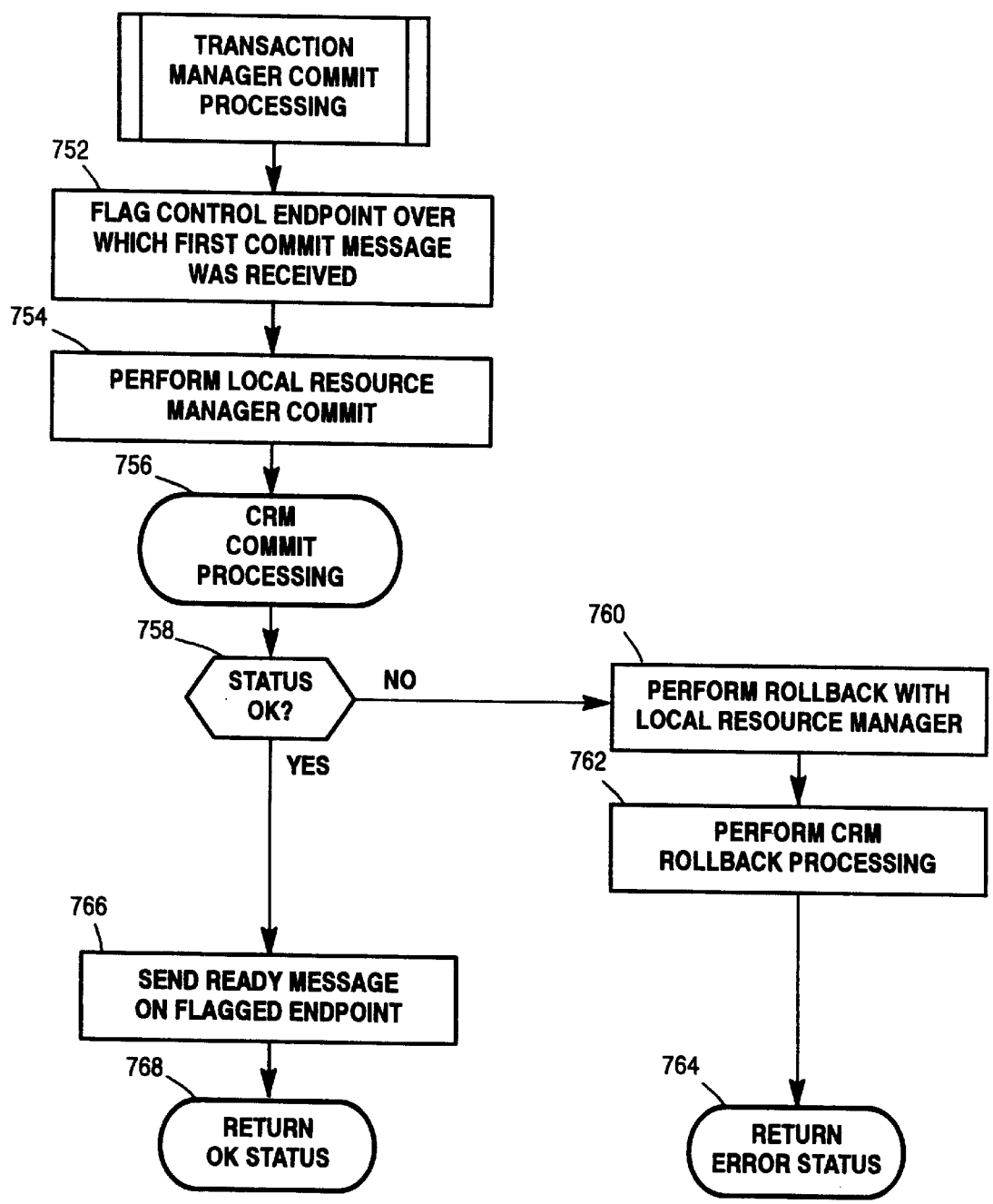
FIG. 15 is a flowchart of the Transaction Manager Commit Processing of the Server System.

FIG. 15 is a flowchart of the Transaction Manager Commit Processing of the Server System 12. Step 752 flags the Control Endpoint over which the first Commit message was received. The Control Endpoint over which the Commit message was received is no longer monitored for a Commit message and is the last Endpoint over which a Done message is returned to the Client System 10. Step 754 performs Commit processing with the Resource Manager 36 that is local to the Server System 12. The local Resource Manager performs a Commit for all the Service Requests that it processed as part of the global transaction.

Step 756 invokes the CRM Commit Processing. The CRM Commit Processing issues Commit messages to subordinate nodes of the Server AP 34, and awaits further Commit messages from the Client System 10. Control does not return from the CRM Commit Processing until all expected Commit messages have been received from the Client System and all expected Done messages have been received from subordinate nodes.

Decision Step 758 tests whether an OK status was returned from the CRM Commit Processing of Step 756. If not, control is directed to Step 760. Step 760 instructs the local Resource Manager to perform a rollback for all Service Requests associated with the global transaction. Step 762 invokes the CRM to perform rollback, and Step 764 returns an error status to the superior node.

If the status returned from CRM Commit Processing is OK, control is directed to Step 766. Step 766 sends a Done message on the Endpoint that was flagged at Step 752, and Step 768 returns control with a status of OK.

Figure 16:
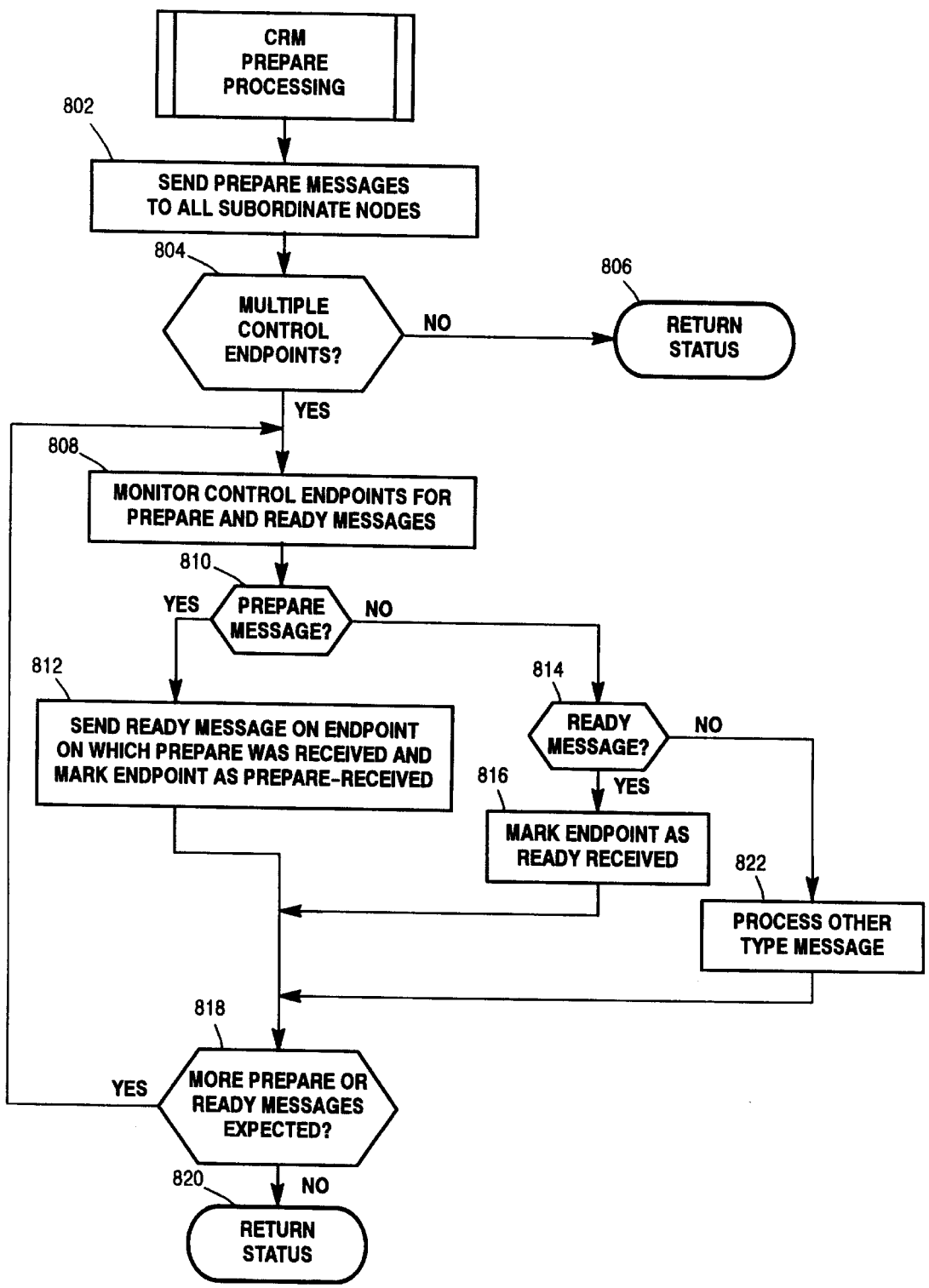
FIG. 16 is a flowchart of the CRM Prepare Processing as invoked from the Transaction Manager Prepare Processing.

FIG. 16 is a flowchart of the CRM Prepare Processing as invoked from the Transaction Manager Prepare Processing. CRM Prepare Processing is invoked from the Transaction Manager Prepare Processing to await Prepare messages from the superior node of the Server AP 34 and return Ready messages to the superior. Step 802 sends Prepare messages to all subordinate nodes. Decision Step 804 tests whether the CRM 20 is monitoring multiple Control Endpoints for a global transaction. If not, control is directed to Step 806 and then returned to Transaction Manager Prepare Processing.

Step 808 waits for Prepare or Ready messages to arrive on the monitored Control Endpoints and directs control to Step 810 when a message arrives. The CRM Prepare Processing monitors all Control Endpoints over which Service Requests were received and sent, except for the Endpoint flagged at Step 702 of FIG. 14. If a Prepare message is received, decision Step 810 directs control to Step 812 where a Ready message is returned on the Endpoint on which the Prepare message was received and the Endpoint is removed from the list of Endpoints to monitor. The Ready message is sent immediately because the Prepare operation was completed at Step 704 of FIG. 14.

If the message received is not a Prepare message, decision Step 810 directs control to decision Step 814. If the message received is a Ready message, control is directed to Step 816 where the Endpoint is marked as having received the expected Ready message. Decision Step 818 then tests whether more Prepare or Ready messages are expected. If so, control is returned to Step 808 to await further messages. Otherwise, control is directed to Step 820 to return the appropriate status to the Transaction Manager Prepare Processing.

If a message other than a Prepare or Ready message was received, decision Step 814 directs control to Step 822. Step 822 processes the message according to the message type and takes appropriate steps if an error condition has occurred.

Figure 17:
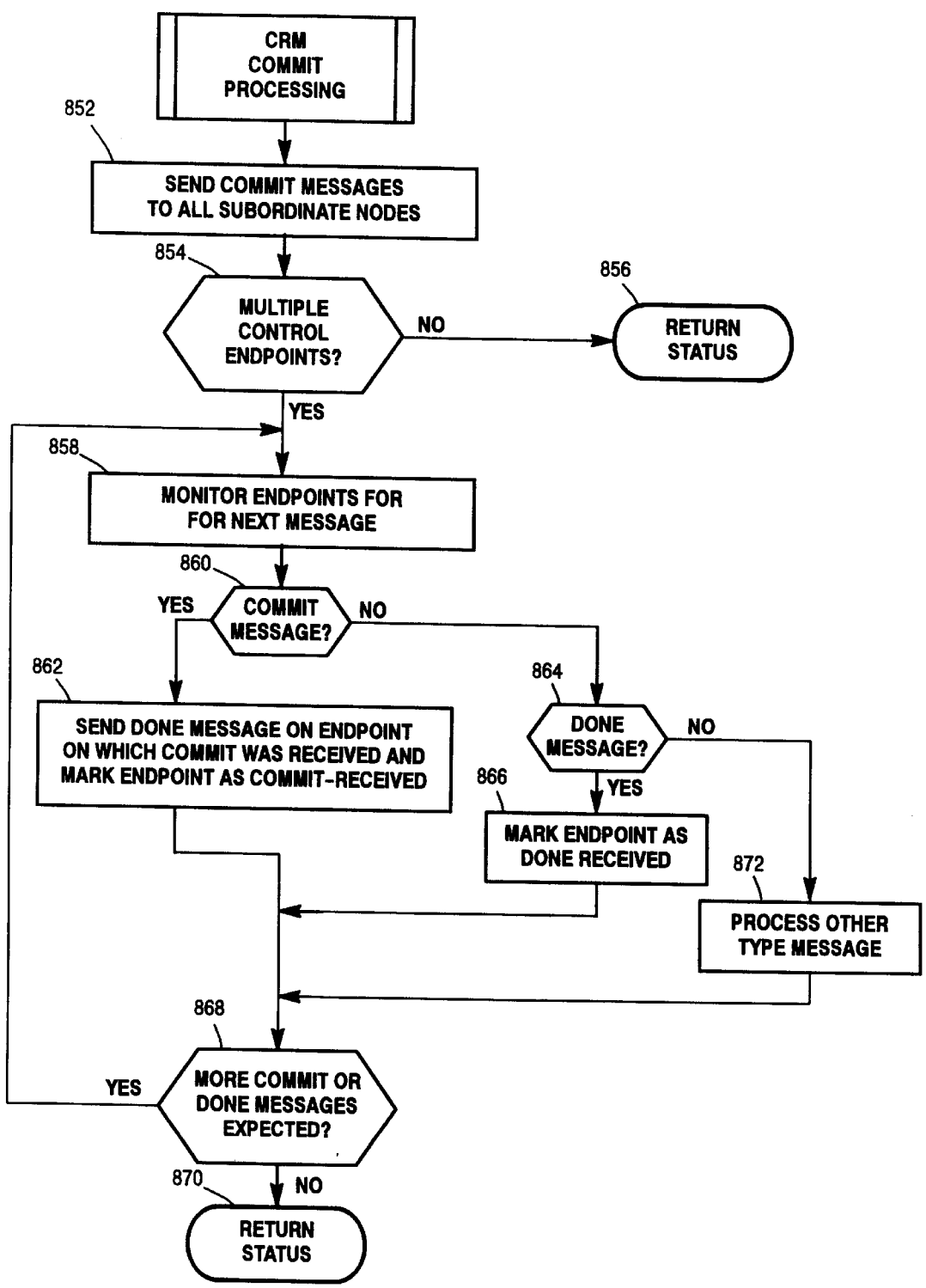
FIG. 17 is a flowchart of the CRM Commit Processing as initiated from the Transaction Manager Commit Processing.

FIG. 17 is a flowchart of the CRM Commit Processing as initiated from the Transaction Manager Commit Processing. The CRM Commit Processing processes waits for Commit messages corresponding to each of the Service Requests that are part of a global transaction and processed by the Server AP 34, with the exception of the first Commit message.

Step 852 sends Commit messages to all subordinate nodes. Decision Step 854 tests whether the CRM 20 is monitoring multiple Control Endpoints for a global transaction. If not, control is directed to Step 856 and then returned to Transaction Manager Commit Processing.

Step 858 waits for Commit or Done messages to arrive on the monitored Control Endpoints and directs control to Step 860 when a message arrives. The CRM Commit Processing monitors all Control Endpoints over which Service Requests were received and sent, except for the Endpoint flagged at Step 752 of FIG. 15. If a Commit message is received, decision Step 860 directs control to Step 862 where a Done message is returned on the Endpoint on which the Commit message was received and the Endpoint is removed from the list of Endpoints to monitor. The Done message is sent immediately because the Commit operation was completed at Step 754 of FIG. 15.

If the message received is not a Commit message, decision Step 860 directs control to decision Step 864. If the message received is a Done message, control is directed to Step 866 where the Endpoint is marked as having received the expected Done message. Decision Step 868 then tests whether more Commit or Done messages are expected. If so, control is returned to Step 858 to await further messages. Otherwise, control is directed to Step 870 to return the appropriate status to the Transaction Manager Commit Processing.

If a message other than a Commit or Done message was received, decision Step 864 directs control to Step 872. Step 872 processes the message according to the message type and takes appropriate steps if an error condition has occurred.

Glossary

AAID—Atomic Action IDentifier is the unique character string identifier that is used to identify an entire transaction tree.

AP—Application Program. The Application Program is a functional component of the X/Open DTP Model that implements the desired end-user function and defines the beginning and end of global transactions.

ACSE—Association Control Service Elements. OSI Association Control Service Element in the Application Layer of the ISO 7-layer OSI Reference Model. The ISO entity that is responsible for establishing and terminating associations (i.e., cooperative relationships) between two applications.

ASE—Application Service Element. A set of application-functions that provides a capability for the inter-working of application-entity-invocations for a specific purpose, such as for generally useful services (e.g., connection management) and services directed to a particular application (e.g., common management information service element).

CRM—Communication Resource Manager. The CRM is a functional component of the X/Open DTP Model that allows interaction between separate instances of the model.

Dialogue—a dialogue is the communication that takes place between two nodes when processing a distributed transaction.

Endpoint—a communications instance that is available to receive an incoming service request or is actively part of a service request.

Instance—a set of computing entities that implement functional components and interfaces of all or part of an application within the X/Open DTP model. Each instance may support one AP, one TM, and multiple RMs. A distributed application is represented by two or more instances and includes a CRM in each instance.

Leaf node—a subordinate node that has no subordinate nodes.

Node—a node represents the invocation of a transaction processing service to process a Service Request.

OSI-TP—Open Systems Interconnection—Transaction Processing. OSI-TP is an ACSE that provides for distributed, coordinated transaction processing.

RM—Resource Manager. A RM is a functional component of the X/Open DTP Model that manages a predetermined part of a computers systems shared resources.

Root node—a node that has no superior node and coordinates Commitment of the distributed transaction.

Subordinate node—a node with which a dialogue is established.

Superior node—a node that initiates a dialogue.

TM—Transaction Manager—The TM is a functional component of the X/Open DTP Model that manages global transactions and coordinates the logic for starting, Committing, and rolling back global transactions.

Transaction Branch—a transaction branch represents the dialogue between two nodes.

Transaction Tree—a graphical representation of the processing entities and dialogues between the processing entities in processing a distributed transaction.

XAP-TP—X/Open Association control service element/Presentation—Transaction Processing extension. XAP-TP is an application programming interface to the services provided by the OSI-TP.

XATMI—an application programming interface from an application program to a Communication Resource Manager that allows application programs to interact using a client server relationship.

X/Open DTP Model—X/Open Distributed Transaction Processing Model. The X/Open DTP Model is a software architecture that allows multiple application programs to share resources and allows their work to be coordinated into global transactions.

Having described an exemplary embodiment of the invention in the drawings and accompanying description, those skilled in the art will recognize that various modifications to the exemplary embodiment could be made without departing from the scope and spirit of the claims set forth below:

I claim:

1. A computer implemented method for processing multiple service requests of a global transaction by a single server application program instance comprising the steps of:

issuing a plurality of service requests to the server application program instance, wherein each of said plurality of service requests contains a global transaction identifier that identifies the global transaction of which said plurality of service requests are a part;

associating the server application program instance with said global transaction identifier;

establishing a list of transaction control endpoints for the server application program instance for receiving transaction control messages and sending responses to said transaction control messages;

before a commitment or a failure to commit, sequentially processing said plurality of service requests by the server application program instance;

monitoring transaction control endpoints specified in said list of transaction control endpoints for transaction control messages by the server application program instance, wherein each of said transaction control messages contains a function and is respectively associated with one of said plurality of service requests; and processing said transaction control messages to ensure that the results of said sequentially processing said plurality of service requests by the server application program instance are either retained as a said commitment for all of said plurality of service requests or discarded as a said failure to commit for all of said plurality of service requests.

2. The method of claim 1, further including the step of starting a new sever application program instance to process a service request when the sever application program instance has not completed processing a previously issued service request.

3. The method of claim 1, wherein said establishing step includes the step of establishing a list OSI-TP transaction control endpoints.

4. The method of claim 1, wherein said step of processing said transaction control messages further includes the steps of:
   performing a function specified in a first received transaction control message for each of said plurality of service requests processed by the server application program instance;
   responding immediately to transaction control messages having said function and received after said first received transaction control message; and
   responding to said first received transaction control message after responding to transaction control messages having said function and received after said first received transaction control message.

5. The method of claim 2, wherein said establishing step includes the step of establishing a list OSI-TP transaction control endpoints.

6. The method of claim 4, wherein said establishing step includes the step of establishing a list of OSI-TP transaction control endpoints.

7. The method of claim 5, further including the step of starting a new server application program instance to process a service request when the server application program instance has not completed processing a previously issued service request.

8. The method of claim 7, wherein said establishing step includes the step of establishing a list of OSI-TP transaction control endpoints.

9. A computer implemented method for processing multiple service requests of a global transaction by a single server application program instance, comprising the steps of:
   issuing a first service request that is part of a global transaction directly to the server application program instance;
   associating said first service request with the server application program instance through an identifier which identifies said global transaction;
   processing said first service request by the server application program instance;
   providing access to a first transaction control endpoint to the server application program instance;
   monitoring said first transaction control endpoint by the server application program instance for transaction control messages associated with said first service request, wherein said transaction control messages contain transaction control functions;
   issuing a second service request that is part of the global transaction directly to the server application program instance;
   associating said second service request with the server application program instance through said identifier which identifies said global transaction;
   providing access to a second transaction control endpoint to the server application program instance;
   restarting the server application program instance to process said second service request;
   monitoring said second transaction control endpoint by the server application program instance for transaction control messages associated with said second service request;
   processing said transaction control functions included in said transaction control messages, said transaction control functions to ensure that when a transaction manager sends a commit message to said server application program instance, either both of said first and second service requests are processed successfully to completion for commitment or the processing results from both of said first and second service requests are not retained; and
   issuing responses to said transaction control messages.

10. The method of claim 9, wherein said restarting step includes the step of starting a server application program second instance to process said second service request if the server application program instance has not completed processing said first service request.

11. The method of claim 9, wherein said step of providing said first transaction control endpoint further includes the step of providing an OSI-TP control endpoint, and said step of providing said second transaction control endpoint includes the step of providing an OSI-TP control endpoint.

12. The method of claim 9, further including the steps of:
   receiving a first transaction control message over said first transaction control endpoint by the server application program instance;
   performing said function specified in said first transaction control message for said first service request and for said second service request upon receipt of said first transaction control message; and
   issuing response messages to the transaction control message.

13. The method of claim 10, wherein said step of providing said first transaction control endpoint further includes the step of providing an OSI-TP control endpoint, and said step of providing said second transaction control endpoint includes the step of providing an OSI-TP control endpoint.

14. The method of claim 12, wherein said step of providing said first transaction control endpoint further includes the step of providing an OSI-TP control endpoint, and said step of providing said second transaction control endpoint includes the step of providing an OSI-TP control endpoint.

15. The method of claim 12, wherein said restarting step includes the step of starting a server application program second instance to process said second service request if the server application program instance has not completed processing said first service request.

16. The method of claim 12,
   wherein said first transaction control message includes a prepare function;
   said performing step includes the step of performing a prepare function for said first service request and for said second service request;
   and further including the steps of
   receiving a second transaction control message over the second transaction control endpoint, wherein said second transaction control message contains a prepare function for said second service request;
   immediately issuing a response message to said second transaction control message to indicate that said prepare function was performed for said second service request;

after said step of issuing a response message to said second transaction control message, issuing a response message to said first transaction control message to indicate that said prepare function was performed for said first service request;

receiving a third transaction control message over said first transaction control endpoint, wherein said third transaction control message contains a commit function for said first service request;

performing said commit function for said first service request and for said second service request upon receipt of said third transaction control message;

receiving a fourth transaction control message over said second transaction control endpoint, wherein said fourth transaction control message contains a commit function for said second service request;

immediately issuing a response message to said fourth transaction control message to indicate that said commit function was performed for said second service request; and after said step of issuing a response message to said fourth transaction control message, issuing a response message to said third transaction control message to indicate that said commit function was performed for said first service request.

17. The method of claim 15, wherein said of providing said first transaction control endpoint further includes the step of providing an OSI-TP control endpoint, and said step of providing said second transaction control endpoint includes the step of providing an OSI-TP control endpoint.

18. The method of claim 16, wherein said step of providing said first transaction control endpoint further includes the step of providing an OSI-TP control endpoint, and said step of providing said second transaction control endpoint includes the step of providing an OSI-TP control endpoint.

19. The method of claim 17, wherein said restarting step includes the step of starting a server application program second instance to process said second service request if the server application program instance has not completed processing said first service request.

20. The method of claim 19, wherein said step of providing said first transaction control endpoint further includes the step of providing an OSI-TP control endpoint, and said step of providing said second transaction control endpoint includes the step of providing an OSI-TP control endpoint.

21. A computer implemented method for processing multiple service requests of a global transaction, comprising the steps of:

establishing a global transaction identifier;

generating a first service request by a client application program instance, wherein said first service request includes said global transaction identifier;

obtaining a first transaction thread identifier for said client application program instance;

obtaining a first transaction control endpoint for said first service request;

associating said first transaction thread identifier with said global transaction identifier;

associating said first transaction control endpoint with said first transaction thread identifier;

issuing said first service request to a server application program instance using said first transaction control endpoint;

receiving said first service request on a server system;

obtaining a second transaction thread identifier on said server system for said server application program instance;

associating said second transaction thread identifier with said global transaction identifier from said first service request;

initiating said server application program instance to process said first service request; and providing said server application program instance with a second transaction control endpoint for sending and receiving transaction control messages for said first service request, said transaction control messages to ensure that said first service request and any subsequent ones of the multiple service requests of the global transaction which are received by said server application program instance are either all processed or none are processed.

22. The method of claim 21, further including the steps of:

generating a second service request by a client application program instance, wherein said second service request includes said global transaction identifier;

issuing said second service request to the server application program instance;

receiving said second service request on said server system;

obtaining said second transaction thread identifier on said server system; and starting a new server application program instance to process said second service request when the server application program instance identified by said second transaction thread identifier has not completed processing said first service request.

23. The method of claim 21, further including the steps of:

generating a second service request by a client application program instance, wherein said second service request includes said global transaction identifier;

issuing said second service request to the server application program instance;

receiving said second service request on said server system;

obtaining said second transaction thread identifier on said server system;

initiating on said server system said server application program instance to process said second service request;

providing said server application program instance with a third transaction control endpoint for sending and receiving transaction control messages for said second service request;

performing a function specified in a first received transaction control message for said first service request;

responding by said server application program instance immediately to transaction control messages having said function and received after said first received transaction control message; and responding by said server application program instance to said first received transaction control message after responding to transaction control messages having said function and received after said first received transaction control message.

24. The method of claim 23, wherein said step of initiating the server application program instance includes the step of starting a new server application program instance to process said second service request when the server application program instance identified by said second transaction thread identifier has not completed processing said first service request.

25. A global transaction processing system, comprising:

a client data processing system;

a server data processing system coupled to said client data processing system;

issue means operable on said client data processing system for issuing a plurality of service requests belonging to a global transaction, wherein each of said plurality of service requests contains a global transaction identifier that identifies the global transaction of which said plurality of service requests are a part;

establishment means operable on said server data processing system for establishing a list of transaction control endpoints for receiving transaction control messages and sending responses to said transaction control messages;

server application program instance means operable on said server data processing system for sequentially processing said plurality of service requests and for monitoring transaction control endpoints specified in said list of transaction control endpoints for transaction control messages, wherein each of said transaction control messages contains a function and is respectively associated with one of said plurality of service requests;

association means coupled to said server application program instance means for associating the server application program instance means with said global transaction identifier; and process means coupled to said server application program instance means for processing said transaction control messages.

* * * * *